US012560979B2

(12) United States Patent
An et al.

(10) Patent No.: US 12,560,979 B2
(45) Date of Patent: Feb. 24, 2026

(54) ELECTRONIC DEVICE INCLUDING FOLDABLE DISPLAY

(71) Applicant: Samsung Electronics Co., Ltd., Suwon-si (KR)

(72) Inventors: Jungchul An, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 18/304,693

(22) Filed: Apr. 21, 2023

(65) Prior Publication Data

US 2023/0259178 A1      Aug. 17, 2023

Related U.S. Application Data

(63) Continuation of application No. PCT/KR2022/013592, filed on Sep. 13, 2022.

(30) Foreign Application Priority Data

Oct. 18, 2021    (KR) ........................ 10-2021-0138576
Dec. 22, 2021    (KR) ........................ 10-2021-0185157

(51) Int. Cl.
*G06F 1/16* (2006.01)

(52) U.S. Cl.
CPC .......... *G06F 1/1681* (2013.01); *G06F 1/1643* (2013.01); *G06F 1/1652* (2013.01); *G06F 1/1656* (2013.01)

(58) Field of Classification Search
CPC .... G06F 1/1681; G06F 1/1643; G06F 1/1652; G06F 1/1656
See application file for complete search history.

(56) References Cited

U.S. PATENT DOCUMENTS 9,348,450 B1     5/2016  Kim
11,073,863 B2     7/2021  Kim et al.
(Continued)

FOREIGN PATENT DOCUMENTS

CN          109688252 A      4/2019
CN          110164316 A      8/2019
(Continued)

OTHER PUBLICATIONS

Machine translation (Year: 2020).*
(Continued)

*Primary Examiner* — Allen L Parker
*Assistant Examiner* — Peter Krim
(74) *Attorney, Agent, or Firm* — Jefferson IP Law, LLP

(57) ABSTRACT

An electronic device is provided. The electronic device includes a first housing and a second housing, a foldable display including a first area disposed on the front surface of the first housing and a second area disposed on the front surface of the second housing, a hinge structure connecting the first housing to the second housing such that the second housing is rotatable about a first axis with respect to the first housing, and a metal plate disposed on the rear surface of the foldable display, wherein the metal plate includes a first metal plate disposed on the rear surface of the first area and covering at least a part of the first housing and a part of the hinge structure, and a second metal plate disposed on the rear surface of the second area and covering at least a part of the second housing.

22 Claims, 20 Drawing Sheets

(56)                References Cited

U.S. PATENT DOCUMENTS

| | | | |
|---|---|---|---|
| 11,256,293 | B2 | 2/2022 | Lee |
| 11,314,283 | B2 * | 4/2022 | Yeh .......................... E05D 7/00 |
| 11,706,886 | B2 * | 7/2023 | Wu ....................... G06F 1/1681 |
| | | | 361/807 |
| 2019/0369668 | A1 * | 12/2019 | Kim ....................... G06F 1/1652 |
| 2020/0053897 | A1 * | 2/2020 | Woo ................... H04M 1/0266 |
| 2020/0162596 | A1 * | 5/2020 | Kim ....................... G06F 1/1683 |
| 2020/0319672 | A1 * | 10/2020 | Kim ....................... G06F 1/1656 |
| 2020/0352038 | A1 | 11/2020 | Kim et al. |
| 2021/0191460 | A1 | 6/2021 | Lee et al. |
| 2021/0280095 | A1 | 9/2021 | He |
| 2022/0244761 | A1 | 8/2022 | Kim et al. |

FOREIGN PATENT DOCUMENTS

| | | | |
|---|---|---|---|
| CN | 210294949 U | | 4/2020 |
| CN | 210324958 U | * | 4/2020 |
| CN | 111179762 A | | 5/2020 |
| CN | 210627727 U | * | 5/2020 |
| KR | 10-2016-0083608 A | | 7/2016 |
| KR | 10-2019-0137433 A | | 12/2019 |
| KR | 10-2020-0127741 A | | 11/2020 |
| KR | 10-2021-0011737 A | | 2/2021 |
| KR | 10-2021-0012090 A | | 2/2021 |
| KR | 10-2021-0049238 A | | 5/2021 |
| KR | 10-2021-0081045 A | | 7/2021 |
| KR | 10-2021-0087316 A | | 7/2021 |
| KR | 10-2023-0023166 A | | 2/2023 |

OTHER PUBLICATIONS

Machine Translation for CN210324958U (Year: 2025).*
Machine Translation for CN210627727U (Year: 2025).*
International Search Report dated Dec. 27, 2022, issued in an International Application No. PCT/KR2022/013592.
Korean Office Action dated Sep. 6, 2024, issued in Korean Application No. 10-2021-0185157.
Notice of Final Rejection dated May 22, 2025, issued in Korean Application No. 10-2021-0185157.
Korean Notice of Patent Grant dated Jan. 21, 2026, issued in Korean Application No. 10-2021-0185157.

* cited by examiner

First axis 912
924
C'
954
1020
923
943
C
1010
Second state
(Folded state)

C'
Third direction
924
1010
954
943
1110
923
First thickness
1120
Second thickness
C
First state
(Flat state)

ELECTRONIC DEVICE INCLUDING FOLDABLE DISPLAY

CROSS-REFERENCE TO RELATED APPLICATION(S)

This application is a continuation application, claiming priority under § 365(c), of an International application No. PCT/KR2022/013592, filed on Sep. 13, 2022, which is based on and claims the benefit of a Korean patent application number 10-2021-0138576, filed on Oct. 18, 2021, in the Korean Intellectual Property Office, and of a Korean patent application number 10-2021-0185157, filed on Dec. 22, 2021, in the Korean Intellectual Property Office, the disclosure of each of which is incorporated by reference herein in its entirety.

TECHNICAL FIELD

The disclosure relates to an electronic device including a foldable display.

BACKGROUND ART

In the case of an electronic device including a display, there is a limitation in that the size of the housing of the electronic device must be increased as the display becomes larger. Accordingly, display electronic devices that can satisfy customer needs such as portability and convenience while overcoming the limitation are being developed.

As a representative example, an electronic device may include a foldable display. For example, an electronic device including a foldable display may secure portability by reducing the display through folding of the housing and the display of the electronic device in half. In addition, the electronic device including a foldable display may provide convenience by providing a wide screen to the user through unfolding of the housing and the display.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device including a foldable display may provide a display that is folded or unfolded about a folding axis. In order to provide a display that is folded or unfolded, a creased lattice structure may be formed in an area (hereinafter "folding part") adjacent to the folding axis of the foldable display, and the folding part of the foldable display may be formed to be thin.

However, as the lattice structure and the display are formed to be thin, the folding part may be vulnerable to external impact. For example, when the electronic device receives impact from the outside, a shear motion or torsion may occur in a housing and the display with reference to the folding axis. The foldable part of the display may be damaged by the occurrence of shear motion or torsion of the display.

In order to overcome this, the electronic device may further include a cover panel. However, when the electronic device includes a thick cover panel to ensure the durability of the display, the thickness of the folding part of the display may increase. When the thickness of the folding part increases, the folding radius of the electronic device may be limited.

Also, in a state in which the electronic device is folded, the cover panel may be subjected to deformation stress. The deformation stress may cause creases in the cover panel or the display in the flat state of the electronic device. Therefore, when creases are made on the display, the visibility of the electronic device may be impaired.

In addition, an additional adhesive layer for attaching the cover panel may be required, and thus the cost of manufacturing the electronic device may increase.

Aspects of the disclosure are to address at least the above-mentioned problems and/or disadvantages and to provide at least the advantages described below. Accordingly, an aspect of the disclosure is to provide a foldable display having durability improved by reducing a shear motion or torsion of the folding axis of the display in spite of external impact.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a first housing and a second housing, a foldable display including a first area disposed on the front surface of the first housing and a second area disposed on the front surface of the second housing, a hinge structure connecting the first housing to the second housing such that the second housing is rotatable about a first axis with respect to the first housing, and a metal plate disposed on the rear surface of the foldable display, wherein the metal plate includes a first metal plate disposed on the rear surface of the first area and covering at least a part of the first housing and a part of the hinge structure, and a second metal plate disposed on the rear surface of the second area and covering at least a part of the second housing and a part of the hinge structure, the first metal plate includes a first recess recessed from a first periphery of the first metal plate adjacent to the first axis, and a first protrusion spaced apart from the first recess and extending from the first periphery, and the second metal plate includes a second recess recessed from a second periphery of the second metal plate adjacent to the first axis and receiving the first protrusion when the housing is unfolded, and a second protrusion extending from the second periphery and inserted into the first recess when the housing is unfolded.

In accordance with another aspect of the disclosure, an electronic device is provided. The electronic device includes a housing including a first housing and a second housing, a foldable display including a first area disposed on the front surface of the first housing and a second area disposed on the front surface of the second housing, a hinge structure connecting the first housing to the second housing such that the second housing is rotatable about a first axis with respect to the first housing, the hinge structure including a hinge gear allowing the second housing to rotate about the first axis and a hinge module connected to the hinge gear, and a metal plate disposed on the rear surface of the foldable display, wherein the metal plate includes a first metal plate disposed on the rear surface of the first area and covering at least a part of the first housing and a part of the hinge structure, and a second metal plate disposed on the rear surface of the second area and covering at least a part of the second housing and a part of the hinge structure, the first metal plate includes a first recess recessed from a first periphery of the first metal plate adjacent to the first axis, and a first protrusion spaced apart from the first recess and extending from the first periphery, the second metal plate includes a second recess recessed from a second periphery of the second metal plate adjacent to the first axis and receiving the first protrusion when the housing is unfolded, and a second protrusion extending from the second periphery and inserted into the first recess when the housing is unfolded, and the hinge module includes a first hinge module, which is disposed on the rear surface of the first metal plate and includes a first hinge module protrusion overlapping the first protrusion and a second hinge module recess overlapping the first recess when viewed from the front surface of the electronic device, and a second hinge module, which is disposed on the rear surface of the second metal plate and includes a first hinge module protrusion overlapping the second protrusion and a second hinge module recess overlapping the second recess when viewed from the front surface of the electronic device.

Advantageous Effects

According to various embodiments disclosed herein, the electronic device may include a metal plate formed on the rear surface of the display, and thus the possibility of shear motion or torsion of the display may be reduced. Therefore, the electronic device with improved durability may be provided to a user.

Also, according to various embodiments, in the electronic device, a cover panel may be omitted or a cover panel with a reduced thickness may be included, and thus the electronic device may include a display, a folding part of which has a reduced thickness. Therefore, the electronic device may include a display, the folding angle of which is not limited.

Also, according to various embodiments, the electronic device with improved visibility may be provided by reducing the production of creases on the cover panel or the display.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
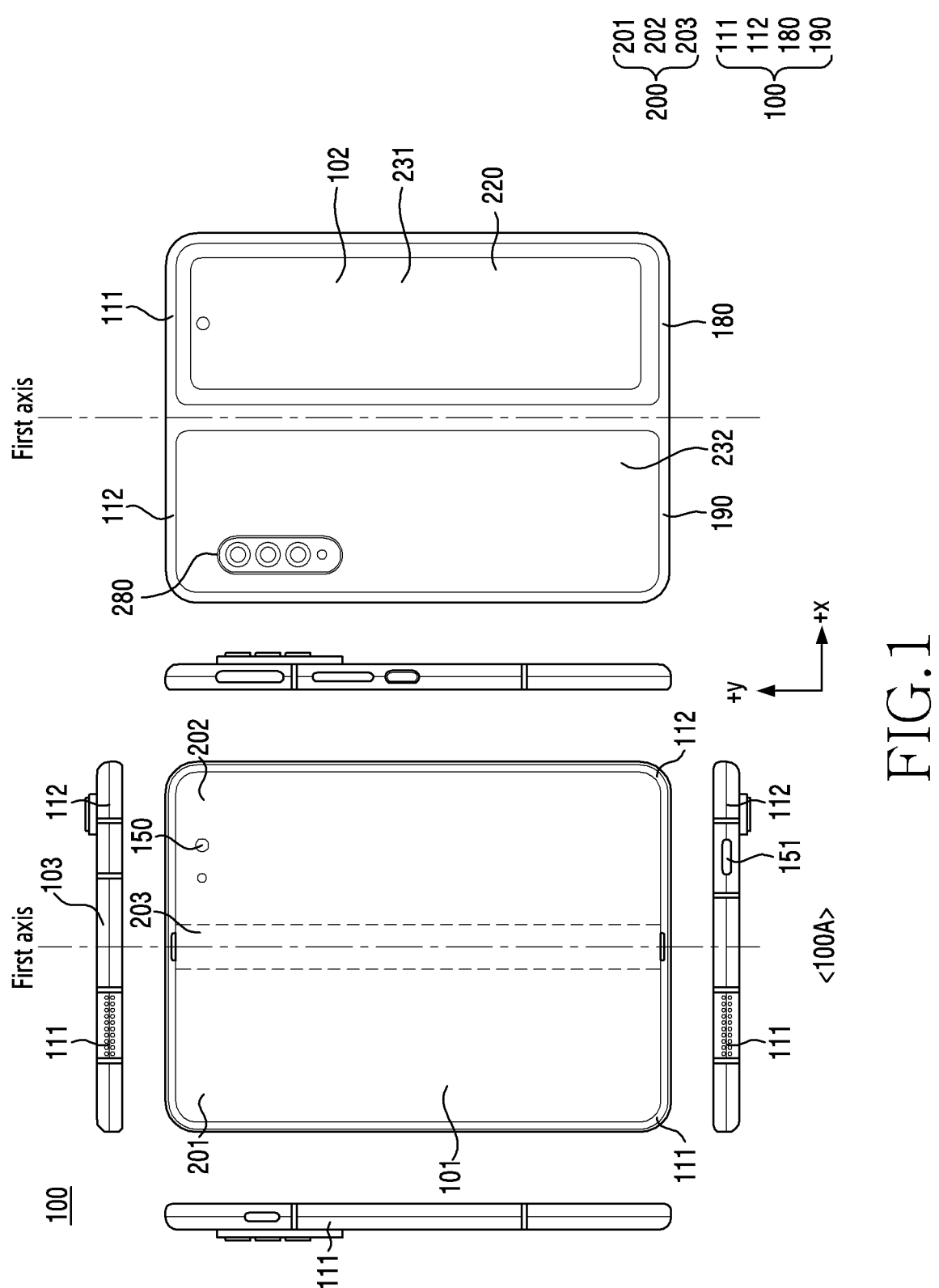
FIG. 1 illustrates a first state (e.g., a flat state) of an electronic device according to an embodiment of the disclosure.

FIG. 1 illustrates a first state (e.g., a flat state) of an electronic device according to an embodiment of the disclosure.

Figure 2:
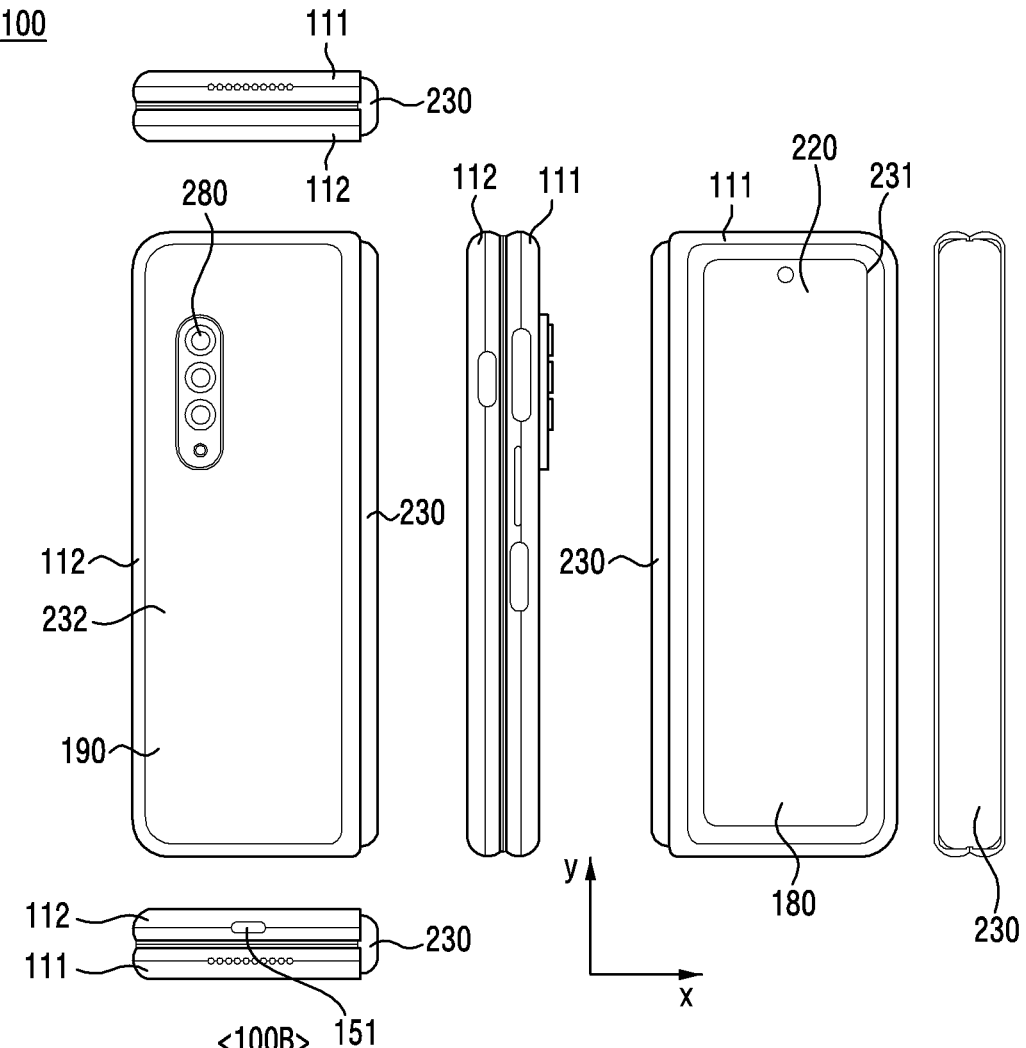
FIG. 2 illustrates a second state (e.g., a folded state) of an electronic device according to an embodiment of the disclosure.

FIG. 2 illustrates a second state (e.g., a folded state) of an electronic device according to an embodiment of the disclosure.

Referring to FIGS. 1 and 2, in an embodiment, an electronic device 100 may include a housing 110, a hinge cover 230 covering a foldable part of the housing 110 and a flexible or foldable main display 200 (hereinafter, for short, "main display" 200) disposed in a space formed by the housing 110. Herein, a surface on which the main display 200 is disposed is defined as a first surface or a front surface 101 of the electronic device 100. Furthermore, a surface opposite to the front surface 101 is defined as a second surface or a rear surface 102 of the electronic device 100. In addition, a surface surrounding the space between the front surface 101 and the rear surface 102 is defined as a third surface or a side surface 103 of the electronic device 100.

According to an embodiment, the housing 110 may include a foldable housing. In an embodiment, the housing 110 may include a first housing 111, a second housing 112, a first rear cover 180, and a second rear cover 190. The housing 110 of the electronic device 100 is not limited to the form and combination shown in FIGS. 1 and 2, and may be implemented by a combination and/or combination of other shapes or components. For example, in another embodiment, the first housing 111 and the first rear cover 180 may be integrally formed, and the second housing 112 and the second rear cover 190 may be integrally formed.

According to an embodiment, a flat state of the electronic device 100 may imply the flat state 100A or the first state 100A. For example, a state in which the first housing 111 and the second housing 112 are unfolded may correspond to the flat state 100A or the first state 100A. Also, a folded state of the electronic device 100 may imply the folded state 100B or the second state (e.g., a folded state 100B). For example, a state in which the second housing 112 is rotated and folded with respect to the first housing 111 may correspond to the folded state 100B or the second state 100B.

According to an embodiment, the angle or distance formed between the first housing 111 and the second housing 112 may vary depending on whether the electronic device 100 is in a flat state, a folded state, or an intermediate state.

In the illustrated embodiment, the first housing 111 and the second housing 112 are disposed at both sides about a folding axis (hereinafter, "first axis"), and may have shapes that are overall symmetric to each other with respect to the first axis. However, the first housing 111 and the second housing 112 may shapes that are asymmetric to each other in a partial area. For example, the second housing 112, unlike the first housing 111, may further include a universal serial bus (USB) hole 151. In other words, the first housing 111 and the second housing 112 may include parts having shapes symmetric to each other and parts having shapes asymmetric to each other.

According to an embodiment, the main display 200 may be symmetrically disposed across the first housing 111 and the second housing 112.

In an embodiment, the first housing 111 and the second housing 112 may be at least partially formed of a metal or non-metal material having a selected degree of rigidity in order to support the main display 200.

In an embodiment, the first rear cover 180 may be disposed at one side of the first axis on the rear surface of the electronic device. For example, the first rear cover 180 may have a substantially rectangular periphery, and the periphery may be surrounded by the first housing 111. Similarly, the second rear cover 190 may be disposed at the other side of the first axis on the rear surface of the electronic device, and the periphery thereof may be surrounded by the second housing 112.

In the illustrated embodiment, the first rear cover 180 and the second rear cover 190 may have shapes which are substantially symmetric to each other about the first axis. However, the first rear cover 180 and the second rear cover 190 do not necessarily have shapes symmetric to each other, and in another embodiment, the electronic device 100 may include the first rear cover 180 and the second rear cover 190 with various shapes.

In an embodiment, the first rear cover 180, the second rear cover 190, the first housing 111, and the second housing 112 may form a face in which various components (e.g., a printed circuit board or a battery) of the electronic device 100 can be disposed. In an embodiment, one or more components may be disposed on the rear surface of the electronic device 100, or may be visually exposed. For example, a part of a sub-display 220 may be visually exposed through a first rear area 231 of the first rear cover 180. According to another embodiment, the sub-display 220 may be disposed on the entire first rear area 231 of the first rear cover 180.

In another embodiment, one or more components or sensors may be visually exposed through a second rear area 232 of the second rear cover 190. In various embodiments, the sensors may include a proximity sensor and/or rear camera 280.

The main display 200 may be disposed in a space formed by the housing 110. For example, the main display 200 may be seated in a recess formed by the housing 110, and may form most of the front surface 101 of the electronic device 100.

Therefore, the front surface 101 of the electronic device 100 may include the main display 200, and a partial area of the first housing 111 and a partial area of the second housing 112, which are adjacent to the main display 200. Furthermore, the rear surface 102 of the electronic device 100 may include the first rear cover 180, a partial area of the first housing 111 adjacent to the first rear cover 180, the second rear cover 190, and a partial area of the second housing 112 adjacent to the second rear cover 190.

The main display 200 may imply a display having at least a partial area capable of being transformed into a flat surface or a curved surface. In an embodiment, the main display 200 may include a folding area 203, a first display area 201 disposed at one side with reference to the folding area 203 (a left side of the folding area 203 illustrated in FIG. 1), and a second display area 202 disposed at the other side (a right side of the folding area 203 illustrated in FIG. 1).

The division of area of the main display 200 illustrated in FIG. 1 is exemplary, and the main display 200 may be divided into multiple (e.g., four or more or two) areas according to a structure or function. For example, in the embodiment illustrated in FIG. 1, the area of the main display 200 may be divided by the folding area 203 or the first axis (folding axis) extending parallel to the y-axis, but in another embodiment, the area of the main display 200 may be divided based on another folding area (e.g., a folding area parallel to the x-axis) or another folding axis (e.g., a folding axis parallel to the x-axis).

In an embodiment, the first display area 201 and the second display area 202 have shapes which are over symmetric to each other about the folding area 203. However, unlike the first display area 201, the second display area 202 may include a camera hole 150, but in other areas, may have a shape symmetric to the first display area 201. In other words, the first display area 201 and the second display area 202 may include parts having shapes symmetric to each other and parts having shapes asymmetric to each other.

According to an embodiment, the camera hole 150 may be visually exposed outside the electronic device 100. According to another embodiment, the camera hole 150 may be disposed under the main display 200 and thus may not be visually exposed.

Hereinafter, a description will be made of the operation of the first housing 111 and the second housing 112 according to the state (e.g., the flat state 100A and the folded state 100B) of the electronic device 100 and each area of the main display 200.

In an embodiment, when the electronic device 100 is in the flat state 100A (e.g., FIG. 1), the first housing 111 and the second housing 112 may be disposed to face the same direction while forming an angle of 180 degrees. The surface of the first display area 201 and the surface of the second display area 202 of the main display 200 may face the same direction (e.g., a direction faced by the front surface of the electronic device) while forming an angle of 180 degrees with each other. The folding area 203 may form the same plane with the first display area 201 and the second display area 202.

In an embodiment, when the electronic device 100 is in the folded state 100B (e.g., FIG. 2), the first housing 111 and the second housing 112 may be disposed to face each other. The surface of the first display area 201 and the surface of the second display area 202 of the main display 200 may face each other while forming a narrow angle (e.g., between 0 to 10 degrees). At least a part of the folding area 203 may be formed as a curved surface having a predetermined curvature.

In an embodiment, when the electronic device 100 is in the intermediate state, the first housing 111 and the second housing 112 may be disposed with a certain angle between each other. The surface of the first display area 201 and the surface of the second display area 202 of the main display 200 may form an angle that is larger than that in the folded state and smaller than that in the flat state. At least a part of the folding area 203 may be formed as a curved surface having a predetermined curvature, and the curvature in this case may be smaller than that in the folded state.

Figure 3:
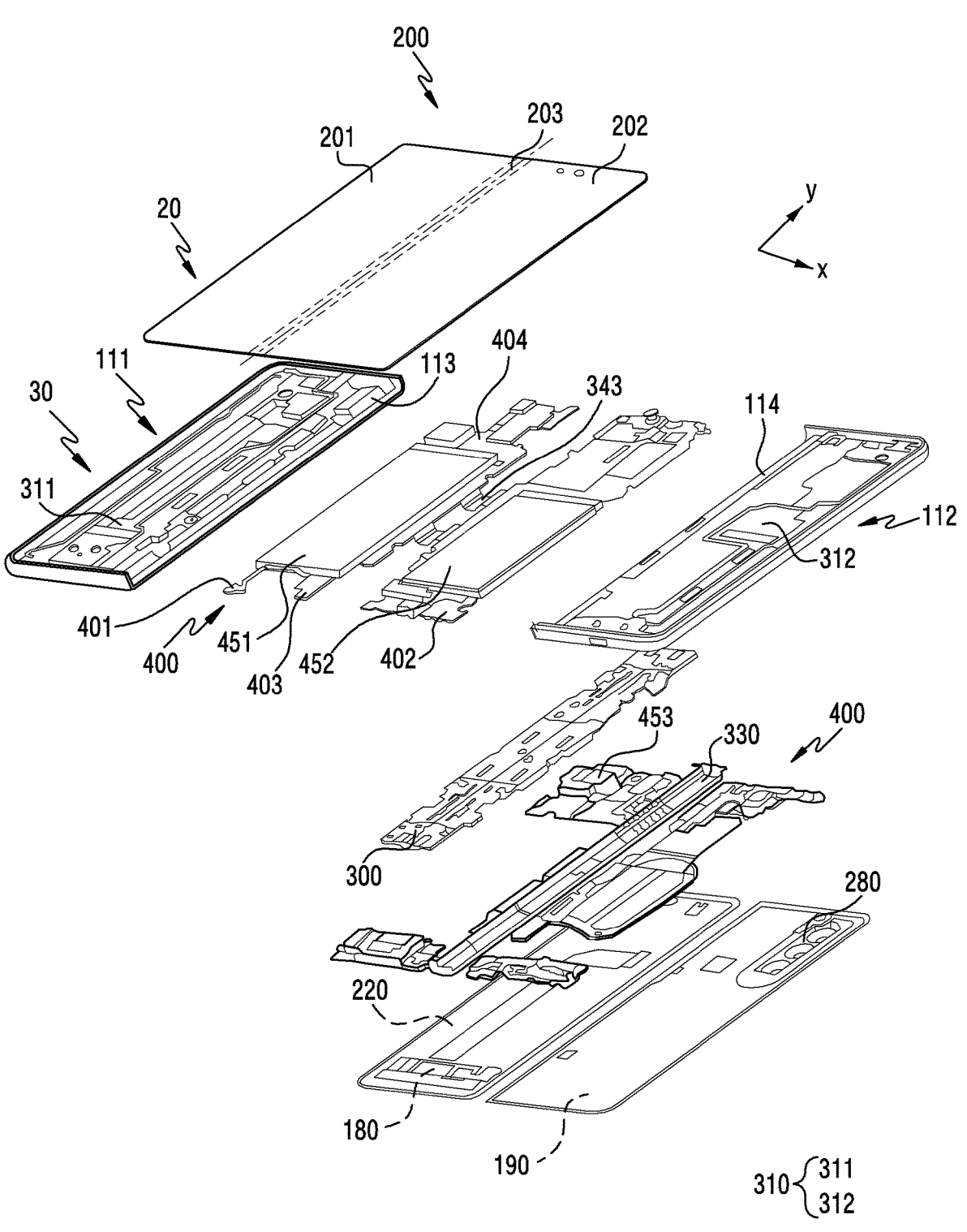
FIG. 3 is an exploded perspective view of an electronic device according to an embodiment of the disclosure.

FIG. 3 is an exploded perspective view of an electronic device according to an embodiment of the disclosure.

Referring to FIG. 3, in an embodiment, an electronic device 100 may include a display unit 20, a bracket assembly 30, a substrate 400, a first housing 111, a second housing 112, a first rear cover 180, and a second rear cover 190. Herein, the display unit 20 may be referred to as a display module or a display assembly.

The display unit 20 may include the main display 200 and at least one plate or layer (not shown) on which the main display 200 is seated. In an embodiment, the plate may be disposed between the main display 200 and the bracket assembly 30. The main display 200 may be disposed on at least a part of one surface (e.g., the top surface with reference to FIG. 3) of the plate. The plate may be formed in a shape corresponding to the main display 200.

The bracket assembly 30 may include a bracket 310 including a first bracket 311 and a second bracket 312, a hinge structure 300 disposed between the first bracket 311 and the second bracket 312, a hinge cover 330 covering the hinge structure 300 when viewed from the outside, and a wiring member 343 (e.g., a flexible printed circuit (FPC), or flexible printed circuit board (FPCB)) across the first bracket 311 and the second bracket 312.

According to an embodiment, the bracket assembly 30 may be formed in the housing 110. For example, the first bracket 311 may be formed in the first housing 111, and the second bracket 312 may be formed in the second housing 112.

Referring to FIG. 3, the hinge cover 330 may be disposed between the first housing 111 and the second housing 112, and may be configured to cover internal components (e.g., the hinge structure 300). In an embodiment, the hinge cover 330 may be covered by a part of each of the first housing 111 and the second housing 112 or exposed outside depending on (the flat state 100A or the folded state 100B) the state of the electronic device 100.

For example, as illustrated in FIG. 2, when the electronic device 100 is in the flat state 100A, the hinge cover 330 may be covered by the first housing 111 and the second housing 112, and thus may not be exposed. For example, as illustrated in FIG. 3, when the electronic device 100 is in the folded state 100B (e.g., a fully folded state), the hinge cover 330 may be exposed outside between the first housing 111 and the second housing 112. For example, in the case of the intermediate state in which the first housing 111 and the second housing 112 are folded with a certain angle, the hinge cover 330 may be partially exposed outside between the first housing 111 and the second housing 112. However, in this case, the exposed area may be smaller than in the fully folded state.

In an embodiment, the hinge cover 330 may include a curved surface.

In an embodiment, the bracket assembly 30 may be disposed between the main display 200 and the substrate 400. For example, the first bracket 311 may be disposed between the first display area 201 of the main display 200 and a first substrate 401. The second bracket 312 may be disposed between the second display area 202 of the main display 200 and a second substrate 402.

In an embodiment, the wiring member 343 and the hinge structure 300 may be at least partially disposed in the bracket assembly 30. The wiring member 343 may be disposed in a direction (e.g., the x-axis direction) across the first bracket 311 and the second bracket 312. The wiring member 343 may be disposed in a direction (e.g., the x-axis direction) perpendicular to the folding area 203 of a folding axis (e.g., the y-axis or the folding axis (the first axis) in FIG. 2) of the electronic device 100.

The substrate 400 may include, as described above, the first substrate 401 disposed at a side of the first bracket 311 and the second substrate 402 disposed at a side of the second bracket 312. The first substrate 401 and the second substrate 402 may be disposed in a space formed by the bracket assembly 30, the first housing 111, the second housing 112, the first rear cover 180, and the second rear cover 190. According to an embodiment, components for implementing various functions of the electronic device 100 may be mounted on the first substrate 401 and the second substrate 402.

According to an embodiment, the first substrate 401 may be formed of multiple substrates.

According to an embodiment, the first substrate 401 may be formed in a shape in which multiple substrates are separated. For example, the first substrate 401 may be formed while being separated into a first printed circuit board 403 and a second printed circuit board 404. The first housing 111 and the second housing 112 may be assembled to be coupled to both sides of the bracket assembly 30 while the display unit 20 is coupled to the bracket assembly 30. As will be described later, the first housing 111 and the second housing 112 may be coupled with the bracket assembly 30 by sliding from both sides of the bracket assembly 30.

In an embodiment, the first housing 111 may include a first rotation support surface 113, and the second housing 112 may include a second rotation support surface 114 corresponding to the first rotation support surface 113. Each of the first rotation support surface 113 and the second rotation support surface 114 may include a curved surface corresponding to a curved surface included in the hinge cover 330.

In an embodiment, when the electronic device 100 is in the flat state 100A (e.g., the electronic device in FIG. 1), the first rotation support surface 113 and the second rotation support surface 114 may cover the hinge cover 330, and thus the hinge cover 330 may not be exposed to the rear surface of the electronic device 100 or may be minimally exposed thereto. On the other hand, when the electronic device 100 is in the folded state 100B (e.g., the electronic device in FIG. 2), the first rotation support surface 113 and the second rotation support surface 114 may rotate along the curved surface included in the hinge cover 330, and thus the hinge cover 330 may be maximally exposed to the rear surface of the electronic device 100.

According to an embodiment, the electronic device 100 may further include a first battery 451, a second battery 452, and a speaker module 453.

According to an embodiment, the first battery 451 and the second battery 452 may be mounted in of the housing 110 of the electronic device 100 and may not be exposed to the outside. For example, the first battery 451 may be mounted in the first housing 111. Furthermore, the second battery 452 may be mounted in the second housing 112.

According to an embodiment, the first battery 451 and the second battery 452 may be electrically connected to each other by the wiring member 343 (e.g., the flexible printed circuit board) disposed between the first housing 111 and the second housing 112.

According to an embodiment, the speaker module 453 may be disposed in the first housing 111. For example, the speaker module 453 may be disposed in an area adjacent to the first battery 451 inside the first housing 111. According to an embodiment, the speaker module 453 may not be exposed outside the electronic device 100. According to an embodiment, the speaker module 453 may be mounted on the second printed circuit board 404 of the first substrate 401.

Figure 4:
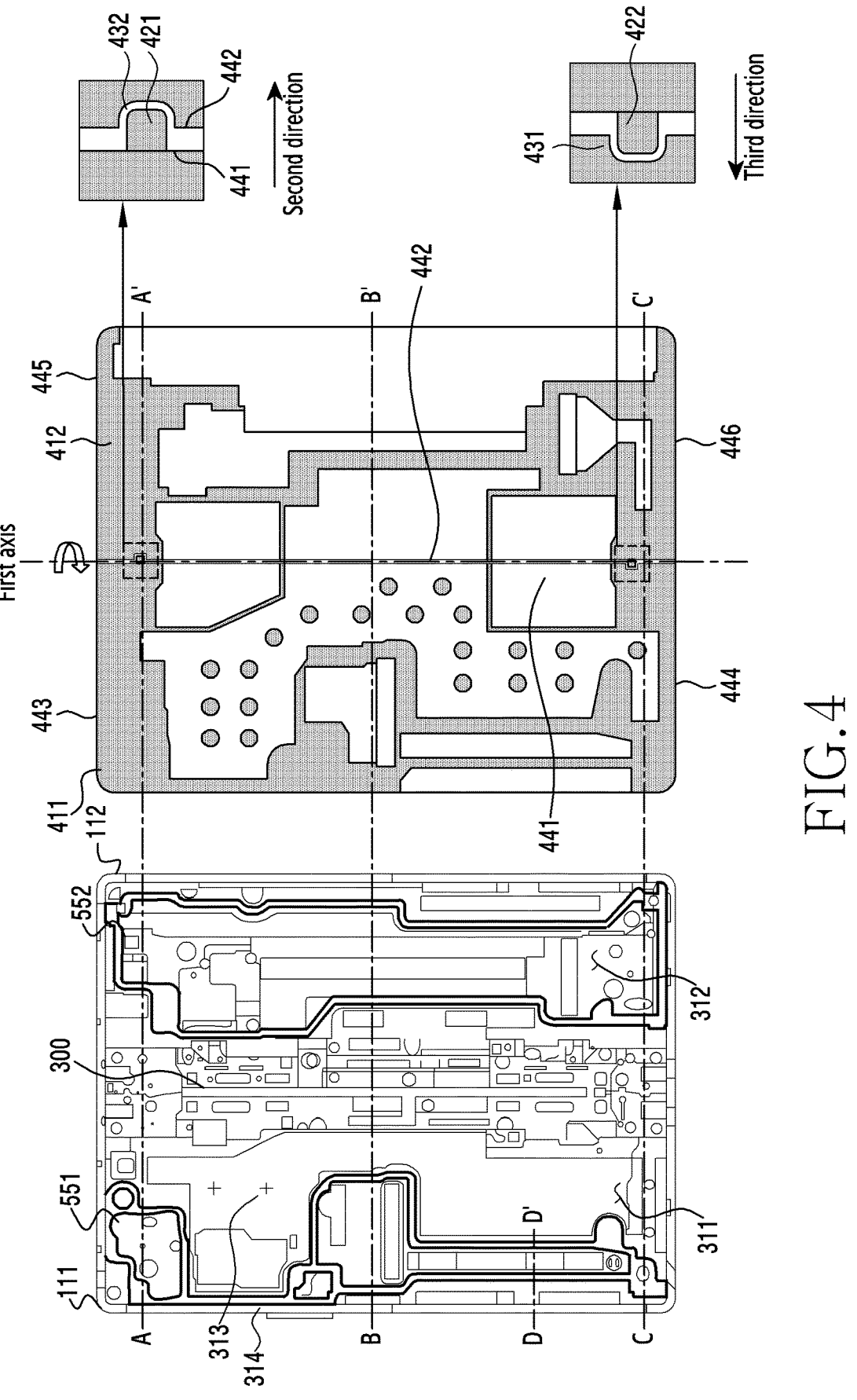
FIG. 4 illustrates the front surface of a metal plate of an electronic device according to an embodiment of the disclosure.

FIG. 4 illustrates the front surface of a metal plate of an electronic device according to an embodiment of the disclosure.

Referring to FIG. 4, an electronic device 100 may include a bracket 310 and a metal plate 410 formed in a housing 110, and a hinge structure 300. According to an embodiment, the electronic device 100 may further include a main display (200 in FIG. 3).

According to an embodiment, the bracket 310 may include the first bracket 311 and the second bracket 312. In an example, the first bracket 311 may be formed in the first housing 111, and the second bracket 312 may be formed in the second housing 112.

According to an embodiment, the first bracket 311 and the second bracket 312 may be connected to each other by the hinge structure 300. For example, the hinge structure 300 may be disposed between the first bracket 311 and the second bracket 312 to physically connect the first bracket 311 to the second bracket 312.

According to an embodiment, the bracket 310 may include a front part 313 facing the front surface of the electronic device 100 and a side part 314.

According to an embodiment, the metal plate 410 may be disposed on the front part 313 of the bracket 310. For example, the metal plate 410 may be attached to a waterproof tape 550 which is disposed on the front part 313 of the bracket 310 and will be described later. Furthermore, according to an embodiment, the main display 200 may be disposed on the metal plate 410. In other words, according to an embodiment, the front part 313 of the bracket 310 may support the metal plate 410 and the main display 200.

According to an embodiment, the side part 314 of the bracket 310 may be surrounded by the housing 110. For example, the side part 314 of the first bracket 311 may be surrounded by the first housing 111, and the side part 314 of the second bracket 312 may be surrounded by the second housing 112.

According to an embodiment, the housing 110 may be formed around a part of the main display 200 disposed on the front part 313 of the bracket 310.

According to an embodiment, unlike a bar-type electronic device in which a housing and a display are attached and fixed to each other, the housing 110 and the main display 200 of the electronic device 100 including the foldable main display 200 may not be attached and fixed to each other. For example, the housing 110 surrounding a part of the main display 200 may surround the main display 200 while being spaced a predetermined distance apart from the side surface of the main display 200.

According to an embodiment, since the housing 110 is formed to be spaced a predetermined distance apart from the side surface of the main display 200, the foldable main display 200 may not collide with the housing 110 when folded. In other words, according to an embodiment, although the foldable main display 200 may slip toward the housing 110 when folded, the main display 200 may not collide with the housing 110.

According to an embodiment, since the main display 200 is not attached to the housing 110, a shear motion may occur in the main display 200 due to external impact.

According to an embodiment, the shear motion may be reduced by a protrusion 420 of the metal plate 410, which will be described later, disposed under the main display 200.

According to an embodiment, a waterproof structure may be formed in the bracket 310. In an example, the waterproof tape 550 may be attached to the bracket 310 to form a waterproof structure.

For example, a first waterproof tape 551 may be attached to the inside of the first bracket 311, and a second waterproof tape 552 may be attached to the inside of the second bracket 312.

According to an embodiment, the first bracket 311 and a first metal plate 411 disposed on the front surface of the first bracket 311 may be in close contact with each other by the first waterproof tape 551, thereby forming a waterproof structure. Furthermore, according to an embodiment, the second bracket 312 and a second metal plate 412 disposed on the front surface of the second bracket 312 by the second waterproof tape 552, thereby forming a waterproof structure.

According to an embodiment, the first waterproof tape 551 of the first bracket 311 and the second waterproof tape 552 of the second bracket 312 may not be formed to be symmetric to each other with respect to a first axis. For example, the first waterproof tape 551 and the second waterproof tape 552 may be differently disposed depending on the position of components embedded in the first bracket 311 and the second bracket 312.

According to an embodiment, the metal plate 410 may be disposed on the rear surface of the main display 200. For example, the metal plate 410 may be disposed between the main display 200 and the bracket 310.

According to an embodiment, the metal plate 410 may include the first metal plate 411 and the second metal plate 412.

According to an embodiment, the first metal plate 411 may be disposed on the rear surface of the first display area 201 of the main display 200. In other words, according to an embodiment, the first metal plate 411 may be disposed on the first housing 111. For example, the first metal plate 411 may cover at least a part of the first housing 111.

According to an embodiment, the second metal plate 412 may be disposed on the rear surface of the second display area 202 of the main display 200. In other words, according to an embodiment, the second metal plate 412 may be disposed on the second housing 112. For example, the second metal plate 412 may cover at least a part of the second housing 112.

According to an embodiment, the first metal plate 411 and the second metal plate 412 may cover a part of the hinge structure 300. For example, when viewed from the front surface 101 of the electronic device 100, the first metal plate 411 may cover a part of the hinge structure 300 adjacent to the first housing 111, and the second metal plate 412 may cover a part of the hinge structure 300 adjacent to the second housing 112.

According to an embodiment, the metal plate 410 may include multiple peripheries 440. For example, the first metal plate 411 may include a first periphery 441, and the second metal plate 412 may include a second periphery 442.

According to an embodiment, the first periphery 441 of the first metal plate 411 and the second periphery 442 of the second metal plate 412 may correspond to peripheries adjacent to the first axis.

According to an embodiment, the first periphery 441 and the second periphery 442 may correspond to peripheries extending in a direction (e.g., a +y direction or a −y direction) toward the first axis of the electronic device 100.

According to an embodiment, the first periphery 441 and the second periphery 442 may correspond to peripheries facing each other when the electronic device 100 is in the flat state 100A. According to an embodiment, the first axis may be formed between the first periphery 441 and the second periphery 442.

According to an embodiment, the metal plate 410 may include at least one protrusion 420 and at least one recess 430. According to an embodiment, the at least one protrusion 420 and the at least one recess 430 may be formed in the first periphery 441 of the first metal plate 411 or the second periphery 442 of the second metal plate 412.

For example, a first recess 431 and a first protrusion 421 may be formed in the first periphery 441 of the first metal plate 411, and a second recess 432 and a second protrusion 422 may be formed in the second periphery 442 of the second metal plate 412.

According to an embodiment, the first protrusion 421 of the first metal plate 411 may be formed to extend from the first periphery 441 of the first metal plate 411. In an example, the first protrusion 421 may be formed to extend from an area of the first periphery 441 of the first metal plate 411. For example, the first protrusion 421 may be formed in an area of the first metal plate 411 adjacent to a first end of the first periphery 441.

In other words, according to an embodiment, the first protrusion 421 may be formed in an area of the first periphery 441 adjacent to a third periphery 443.

According to an embodiment, the first protrusion 421 may protrude in a second direction (e.g., a +x direction) perpendicular to the first axis. For example, in the flat state 100A, the first protrusion 421 may protrude and extend in the second direction (e.g., the +x direction) toward the second metal plate 412.

According to an embodiment, the second protrusion 422 of the second metal plate 412 may be formed to extend from the second periphery 442 of the second metal plate 412. For example, the second protrusion 422 may protrude in a third direction (e.g., a −x direction) opposite to the second direction (e.g., the +x direction). For example, in the flat state 100A, the second protrusion 422 may protrude and extend in the third direction (e.g., the −x direction) toward the first metal plate 411.

According to an embodiment, the first recess 431 of the first metal plate 411 may be recessed from the first periphery 441. In an example, the first recess 431 may be formed to be recessed in an area of the first periphery 441 adjacent to a second end of the first periphery 441. In other words, for example, the first recess 431 may be formed to be recessed in an area of the first periphery 441 adjacent to a fourth periphery 444.

According to an embodiment, the first recess 431 may be formed to be recessed in the third direction (e.g., the −x direction).

According to an embodiment, the second recess 432 of the second metal plate 412 may be recessed from the second periphery 442. In an example, the second recess 432 may be formed to be recessed in an area of the second metal plate 412 adjacent to a first end of the second periphery 442. In other words, for example, the second recess 432 may be formed to be formed in an area of the second periphery 442 adjacent to a fifth periphery 445.

According to an embodiment, the second recess 432 may be recessed in the second direction (e.g., the +x direction). In other words, according to an embodiment, in the first state 100A in which the electronic device 100 is unfolded, the first recess 431 may be recessed in a direction opposite to that of the second metal plate 412, and the second recess 432 may be recessed in a direction opposite to that of the first metal plate 411.

Referring to FIG. 4, the first protrusion 421 according to an embodiment may be formed to be spaced apart from the first recess 431, and the second protrusion 422 may be formed to be spaced apart from the second recess 432.

For example, the first protrusion 421 may be formed in an area of the first periphery 441 adjacent to the third periphery 443 of the first metal plate 411, and the first recess 431 may be formed in an area of the first periphery 441 adjacent to the fourth periphery 444 of the first metal plate 411.

Furthermore, for example, the second protrusion 422 may be formed in an area of the second periphery 442 adjacent to a sixth periphery 446 of the second metal plate 412, and the second recess 432 may be formed in an area of the second periphery 442 adjacent to the fifth periphery 445 of the second metal plate 412.

According to an embodiment, the third periphery 443 of the first metal plate 411 and the fifth periphery 445 of the second metal plate 412 may correspond to the top periphery of the electronic device 100. Furthermore, according to an embodiment, the fourth periphery 444 of the first metal plate 411 and the sixth periphery 446 of the second metal plate 412 may correspond to the bottom periphery of the electronic device 100.

According to an embodiment, when the electronic device 100 is in the flat state 100A, the first protrusion 421 may be recessed into the second recess 432, and the second protrusion 422 may be recessed into the first recess 431.

According to an embodiment, the first recess 431 and the second recess 432 may form spaces capable of receiving the second protrusion 422 and the first protrusion 421.

According to an embodiment, when the second protrusion 422 and the first protrusion 421 are inserted into the spaces, the first metal plate 411 and the second metal plate 412 may be coupled to each other when the electronic device 100 is in the flat state 100A.

According to an embodiment, the first metal plate 411 and the second metal plate 412 may be coupled to each other by the reception of the protrusion 420 in the corresponding recess 430, whereby a shear motion or torsion in the first axis direction of the metal plate 410 (e.g., the +y direction or the −y direction) due to external impact may be reduced compared to the case in which the metal plate 410 is not formed or the case in which the first metal plate 411 and the second metal plate 412 are not coupled to each other.

According to an embodiment, since the shear motion or torsion of the metal plate 410 is reduced, a shear motion or torsion of the main display 200, disposed on the metal plate 410, in the first axis direction may also be reduced.

According to an embodiment, since the shear motion or torsion of the main display 200 is reduced, the main display 200 may be prevented from being damaged by external impact. Therefore, the electronic device 100 may ensure durability.

A specific embodiment related to the protrusion 420 and the recess 430 of the metal plate 410 will be described later with reference to FIGS. 5A to 5C, and 6.

Figure 5A:
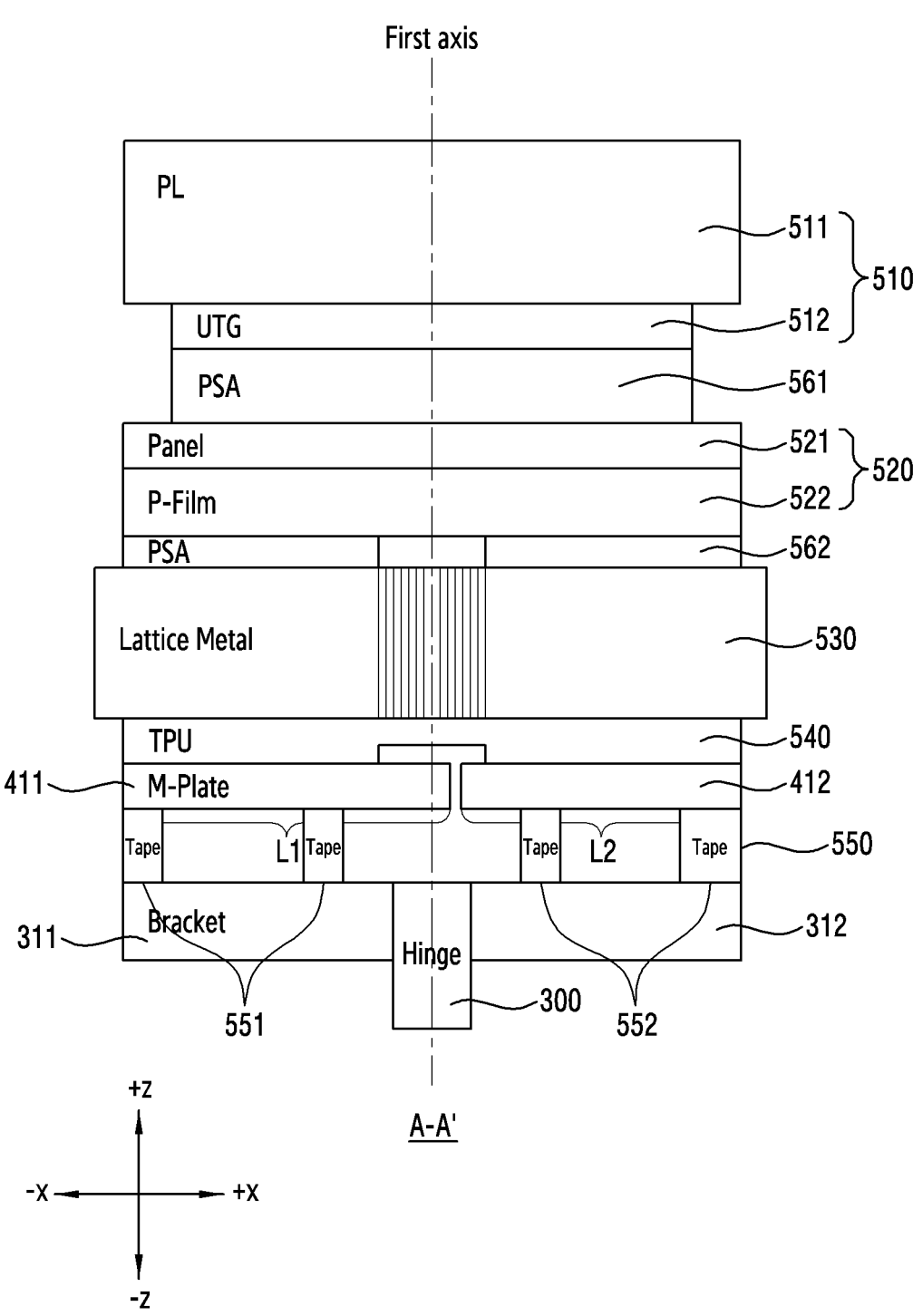
FIG. 5A is a cross-sectional view of an electronic device, taken along line A-A' according to an embodiment of the disclosure.

FIG. 5A is a cross-sectional view of an electronic device, taken along line A-A' according to an embodiment of the disclosure.

According to an embodiment, the electronic device 100 may include the main display 200, the metal plate 410, the bracket 310, and/or the hinge structure 300. According to an embodiment, the electronic device 100 may further include the waterproof tape 550.

According to an embodiment, the main display 200 (or the main display structure) may include multiple layers. According to an embodiment, the main display 200 may include cover glass 510, a display panel 520 disposed adjacent to one surface of the cover glass 510, and/or a dielectric layer structure 530 under the display panel 520.

However, according to an embodiment, the main display 200 is not limited to the above-mentioned structure. For example, some elements (e.g., a thermoplastic material 540) may be omitted, and other elements may be added.

According to an embodiment, the main display 200 may further include an adhesive for bonding the above-mentioned multiple layers described above. According to an embodiment, the adhesive may include may include a pressure sensitive adhesive (PSA), but is not limited thereto. For example, the adhesive may include an optically clear adhesive (OCA), a heat-responsive adhesive, and/or a double-sided tape in addition to the PSA.

According to an embodiment, the cover glass 510 may include a film layer 511 and/or a transparent plate 512. In an embodiment, at least a part of the film layer 511 may be exposed to the outside through the front surface 101 of the electronic device 100. The transparent plate 512 may correspond to ultra-thin tempered glass, but is not limited thereto.

According to an embodiment, the film layer 511 and the transparent plate 512 may be bonded to each other by an adhesive. According to an embodiment, the film layer 511 and the transparent plate 512 are flexible, and thus may be folded or bent. For example, the film layer 511 may be referred to as a polarization film, but is not limited thereto.

According to an embodiment, the main display 200 may include the display panel 520 disposed under the cover glass 510. According to an embodiment, the display panel 520 may be attached to the cover glass 510 by the first adhesive layer 561.

According to an embodiment, the display panel 520 may include a panel 521 and/or a plastic film 522 disposed beneath the panel 521. According to an embodiment, the panel 521 may be attached to the transparent plate 512 by an adhesive (e.g., a PSA).

According to an embodiment, the plastic film 522 may be referred to as a polarization film.

According to an embodiment, the panel 521 may be implemented as a touch panel in which electrodes for receiving touch input, fingerprint recognition, or pen input are disposed. According to an embodiment, the panel 521 may include an organic light-emitting diode (OLED) panel, a liquid crystal display (LCD), or a quantum dot light-emitting diode (QLED) panel. For example, the display panel 520 may include multiple pixels for displaying an image, and one pixel may include a plurality of sub-pixels. For example, one pixel may include three color sub-pixels, a red sub-pixel, a green sub-pixel, and a blue sub-pixel. In another example, one pixel may be formed in an RGBG PenTile type including one red sub-pixel, two green sub-pixels, and one blue sub-pixel.

According to an embodiment, the main display 200 may include the dielectric layer structure 530 disposed under the display panel 520. According to an embodiment, the dielectric layer structure 530 may be attached to the display panel 520 by a second adhesive layer 562 (e.g., PSA). According to an embodiment, the adhesive layer may be formed in an area corresponding to the dielectric layer structure 530. According to another embodiment, the adhesive layer 562 may be disposed to be formed in an area inside an edge of the dielectric layer structure 530.

According to an embodiment, at least a part of the dielectric layer structure 530 may include a lattice pattern. For example, the dielectric layer structure 530 may include a lattice pattern formed in an area adjacent to a first axis. According to an embodiment, the dielectric layer structure 530 includes a lattice pattern, and thus when the electronic device 100 is folded (e.g., the second state 100B) or unfolded (e.g., the first state 100A), the dielectric layer structure 530 and a layer (e.g., the cover glass 510 and/or the metal plate 410) attached to the dielectric layer structure 530 may also be folded or unfolded.

According to an embodiment, the dielectric layer structure 530 may include a material for securing rigidity and a lightweight material. According to an embodiment, the dielectric layer structure 530 may have a structure in which a layer for securing rigidity and a layer formed of a lightweight material are stacked. According to an embodiment, due to the above materials included in the dielectric layer structure 530, the main display 200 may secure rigidity. According to an embodiment, as at least a part of the dielectric layer structure 530 is formed of a lightweight material, the weight of the main display 200 may be reduced.

According to an embodiment, the main display 200 may further include the thermoplastic material 540 (e.g., thermoplastic poly urethane (TPU)) disposed beneath the dielectric layer structure 530. According to an embodiment, the main display 200 may further include the thermoplastic material 540, thereby preventing damage to the display panel 520, the dielectric layer structure 530, and the metal plate 410. For example, the main display 200 may further include the thermoplastic material 540, thereby preventing air bubbles generated between multiple layers disposed in the main display 200.

According to an embodiment, the metal plate 410 may be disposed under the main display 200. For example, the metal plate 410 may be disposed under the dielectric layer structure 530 and/or the thermoplastic material 540 of the main display 200.

According to an embodiment, the metal plate 410 may be formed to be cut off in an area corresponding to the first axis. For example, the first metal plate 411 and the second metal plate 412 may be separately disposed with respect to the first axis. According to an embodiment, the first metal plate 411 and the second metal plate 412 may be disposed to be cut off with respect to the first axis, and thus when the electronic device 100 is folded or unfolded, the metal plate 410 may be folded or unfolded according to each state.

According to another embodiment, a part of the metal plate 410 may include flexibility, and thus may be formed across the folding axis. For example, in relation to the flexibility, an area of the metal plate 410 corresponding to the first axis may be formed flexible, and the remaining area may be formed of a metal member.

According to an embodiment, the metal plate 410 may be referred to as a shielding layer. The metal plate 410 according to an embodiment may reduce noise by shielding magnetic force due to surrounding electronic components in addition to a signal input from an electronic pen.

According to an embodiment, the metal plate 410 may be formed of a metal member. For example, the metal plate 410 may be formed of copper alloy, but is not limited thereto. For example, the metal plate 410 may be formed of stainless use steel (SUS).

Referring to FIGS. 4 and 5A, the first metal plate 411 according to an embodiment may include the first protrusion 421. According to an embodiment, the first protrusion 421 of the first metal plate 411 may be formed, and thus, when viewed on a first plane (e.g., an xz plane), a first length L1 of the first metal plate 411 in a second axis (e.g., the x-axis) direction may be formed to be longer than a second length L2 of the second metal plate 412 in the second axial direction.

Referring to FIG. 5A, according to an embodiment, the first protrusion 421 may be formed. the first metal plate 411 may be formed to protrude in the second direction (e.g., a +x direction) with reference to the first axis when viewed on the first plane (e.g., the xz plane). Furthermore, according to an embodiment, the second metal plate 412 has a second recess (432 in FIG. 4) for receiving the first protrusion 421. The second metal plate 412 may be formed to be spaced in the second direction (e.g., the +x direction) and can be formed spaced apart when viewed from the first plane (e.g., xz plane).

The length of the second metal plate 412 to the first metal plate 411 has been described only in relation to the first protrusion 421, but the disclosure is not limited thereto.

For example, as the second protrusion 422 of the second metal plate 412 is formed, the second length L2 of the second metal plate 412 may be formed to be longer than the first length L1 of the first metal plate 411. Furthermore, according to an embodiment, the second protrusion 422 of the second metal plate 412 is formed, and thus the first metal plate 411 may be formed to be spaced in a third direction (e.g., a −x direction) with respect to the first axis According to an embodiment, the protrusion 420 and the recess 430 are formed on the metal plate 410, and thus the first metal plate 411 and the second metal plate 412 may be coupled to each other when the electronic device 100 is in the flat state 100A (the first state).

In other words, according to an embodiment, when the electronic device 100 is in the flat state 100A (the first state), each protrusion 420 may be inserted into the corresponding recess 430, and thus the first metal plate 411 and the second metal plate 412 may be coupled to each other and fixed in a first axis direction (e.g., a +y direction or a −y direction).

According to an embodiment, the first metal plate 411 and the second metal plate 412 may be coupled to each other, and thus a shear motion or torsion of the metal plate 410 in the first axis direction (e.g., the +y direction or the −y direction) due to external impact may be reduced.

According to an embodiment, as the shear motion or torsion of the metal plate 410 is reduced, a shear motion or torsion of the main display 200 disposed on the metal plate 410 in the first axis direction (e.g., the +y direction or the −y direction) may also be reduced. Therefore, the durability of the main display 200 may be improved.

Therefore, according to an embodiment, the durability of the main display 200 is improved by the structure of the metal plate 410, and thus, in the main display 200, a cover panel may be omitted or a thin cover panel may be included. Since the cover panel may be omitted or the thin cover panel may be included, the production cost and production period of the electronic device 100 may be saved.

Furthermore, according to an embodiment, crease in the folding part of the main display 200 may be reduced due to the thin cover panel, and thus the visibility of the main display 200 of the electronic device 100 may be improved.

According to an embodiment, the bracket 310 may be disposed under the metal plate 410. For example, the first bracket 311 may be disposed under the first metal plate 411, and the second bracket 312 may disposed under the second metal plate 412.

According to an embodiment, the bracket 310 may be disposed under the cover glass 510 or the display panel 520 and extend to the side surface thereof. For example, the bracket 310 may be formed to surround a part of the side surface of the cover glass 510 or the display panel 520.

According to an embodiment, the bracket 310 may extend to be spaced apart from the side surface of the cover glass 510 or the display panel 520 with a predetermined gap. In other words, the bracket 310 may be formed to be spaced apart from the side surface of the main display 200 with a predetermined gap.

According to an embodiment, since the bracket 310 forms the predetermined gap with the side surface of the cover glass 510 or the display panel 520, collision between the side surface of the main display 200 and the bracket 310 may be prevented when the electronic device 100 is folded. In other words, when the electronic device 100 is folded, the main display 200 may laterally slip, and may not collide with the bracket 310 even when the main display 200 slips.

According to an embodiment, a description has been made of an example in which the bracket 310 is formed on the side surface of the main display 200, but is not limited thereto. For example, the housing 110 may be formed with a predetermined gap on the side surface of the main display 200.

In an embodiment, another element may be added between the bracket 310 and the metal plate 410. For example, the waterproof tape 550 may be further added between the bracket 310 and the metal plate 410.

According to an embodiment, the bracket 310 may be disposed in both directions around the hinge structure 300. For example, the first bracket 311 may be disposed in the third direction (e.g., the −x direction) with respect to the hinge structure 300, and the second bracket 312 may be disposed in the second direction (e.g., the +x direction) with respect to the hinge structure 300.

According to an embodiment, the metal plate 410 may be attached to the bracket 310 by an adhesive part. According to an embodiment, the adhesive part may correspond to a waterproof member (hereinafter, "the waterproof tape 550"), but is not limited thereto. For example, the adhesive part may correspond to a waterproof bond.

According to an embodiment, the waterproof tape 550 may be disposed between the metal plate 410 and the bracket 310. For example, the first waterproof tape 551 may be disposed between the first metal plate 411 and the first bracket 311, and the second waterproof tape 552 may be disposed between the second metal plate 412 and the second bracket 312. In other words, the first waterproof tape 551 may be disposed beneath the first metal plate 411, and the second waterproof tape 552 may be disposed beneath the second metal plate 412.

According to an embodiment, the waterproof tape 550 may be disposed in a first area adjacent to the first axis and in a second area spaced apart from the first area and adjacent to the ends of the bracket 310 and the metal plate 410. In other words, according to an embodiment, a part of the waterproof tape 550 may be disposed adjacent to the hinge structure 300, and another part of the waterproof tape 550 may be disposed to be spaced apart from the hinge structure 300.

For example, the first waterproof tape 551 disposed beneath the first metal plate 411 may be disposed in a first area adjacent to the first axis and in a second area spaced apart from the first area and adjacent to the end of the first metal plate 411. Furthermore, for example, the second waterproof tape 552 disposed beneath the second metal plate 412 may be disposed in a first area adjacent to the first axis and in a second area spaced apart from the first area and adjacent to the end of the second metal plate 412.

According to an embodiment, since the waterproof tape 550 is disposed, the waterproof tape 550 may perform a waterproof function for the electronic device 100 and may fix the main display 200 and/or the metal plate 410 to the bracket 310.

According to an embodiment, since the waterproof tape 550 is also formed in the first area adjacent to the first axis, a bigger shear motion of the main display 200 may occur than when the waterproof tape 550 is formed only in the second area spaced apart from the first axis.

Furthermore, according to an embodiment, when the first housing 111 and the second housing 112 may be separately formed under the main display 200, a bigger shear motion of the main display 200 may occur than when the first housing 111 and the second housing 112 are formed as a single housing.

According to an embodiment, an increase in a shear motion of the main display 200 by the separate housing 110 and the waterproof tape 550 may be reduced by forming the protrusion 420 and the recess 430 on the metal plate 410.

In other words, the first metal plate 411 and the second metal plate 412 may be coupled to each other by insertion of each protrusion 420 into the corresponding recess 430, whereby the shear motion or torsion of the metal plate 410 in the first axis direction (e.g., the +y direction or the −y direction) due to external impact may be reduced.

According to an embodiment, as the shear motion or torsion of the metal plate 410 in the first axis direction is reduced, the shear motion or torsion of the main display 200 may be reduced.

According to an embodiment, the hinge structure 300 may be disposed in an area corresponding to the first axis. In other words, according to an embodiment, the hinge structure 300 may be disposed at a folding part. According to an embodiment, the first axis may mean a central axis of the hinge structure 300, but is not limited thereto. For example, the first axis may be an axis partially spaced apart from the center of the hinge structure 300 in the second direction (e.g., the +x direction) or the third direction (e.g., the −x direction).

According to an embodiment, since the first axis corresponds to an axis of one area of the hinge structure 300, the electronic device 100 may be folded or unfolded by the hinge structure 300 about the first axis. In other words, the second housing 112 may be rotated by the hinge structure 300 about the first axis with respect to the first housing 111 of the electronic device 100.

A specific embodiment of the hinge structure 300 will be described later with reference to FIGS. 8, 9A, 9B, and 10 to 13.

Figure 5B:
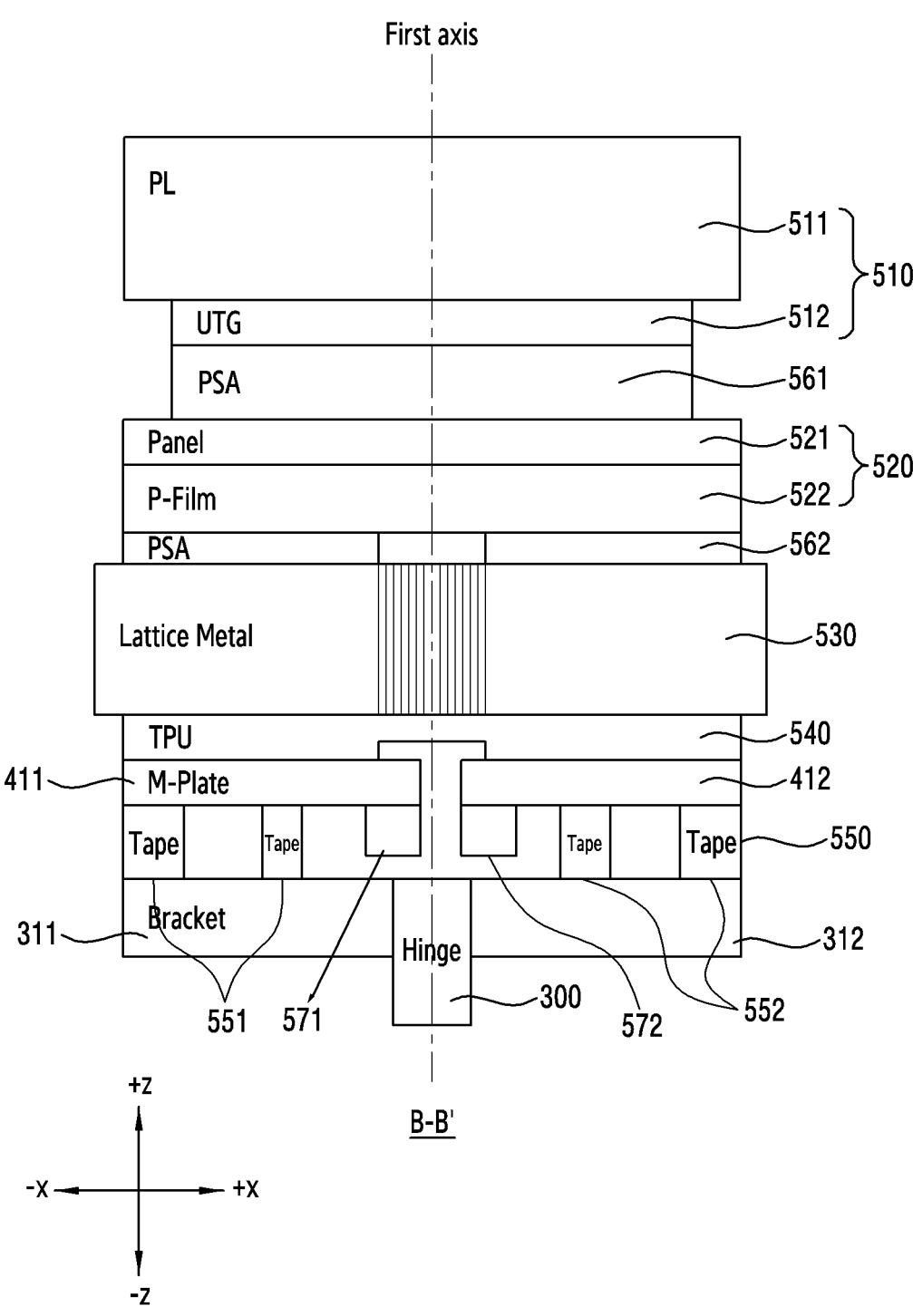
FIG. 5B is a cross-sectional view of the electronic device in FIG. 4, taken along line B-B' according to an embodiment of the disclosure.

FIG. 5B is a cross-sectional view of the electronic device in FIG. 4, taken along line B-B' according to an embodiment of the disclosure.

According to an embodiment, unlike the electronic device 100 having the cross-section A-A' in FIG. 5A, the electronic device 100 in FIG. 5B may further include a lower material 570.

According to an embodiment, a cross-section B-B' in FIG. 5B corresponds to a center area of the hinge structure 300 through which a wiring member (343 in FIG. 3) passes. Therefore, unlike the metal plate 410 in the cross-section A-A' in FIG. 5A, the metal plate 410 in FIG. 5B may not include the protrusion 420 and the recess 430.

According to an embodiment, the waterproof tape 550 and the lower material 570 may be further disposed between the metal plate 410 and the bracket 310. For example, the waterproof tape 550 may be disposed in a first area adjacent to a first axis and in a second area spaced apart from the first area and adjacent to the ends of the bracket 310 and the metal plate 410.

Furthermore, according to an embodiment, the lower material 570 may be disposed in an area closer the first axis than the first area is.

According to an embodiment, the lower material 570 may be disposed beneath the metal plate 410. According to an embodiment, the lower material 570 may include a first lower material 571 and a second lower material 572, the first lower material 571 may be disposed beneath the first metal plate 411, and the second lower material 572 may be disposed beneath the second metal plate 412.

According to an embodiment, the first lower material 571 may correspond to a shielding sheet, and the shielding sheet may be formed in a partial area under the metal plate 410 corresponding to the hinge structure 300.

According to an embodiment, the lower material 570 has been described as being able to correspond to a shielding sheet, but is not limited thereto. For example, the lower material 570 may correspond to graphite or a cushion.

Figure 5C:
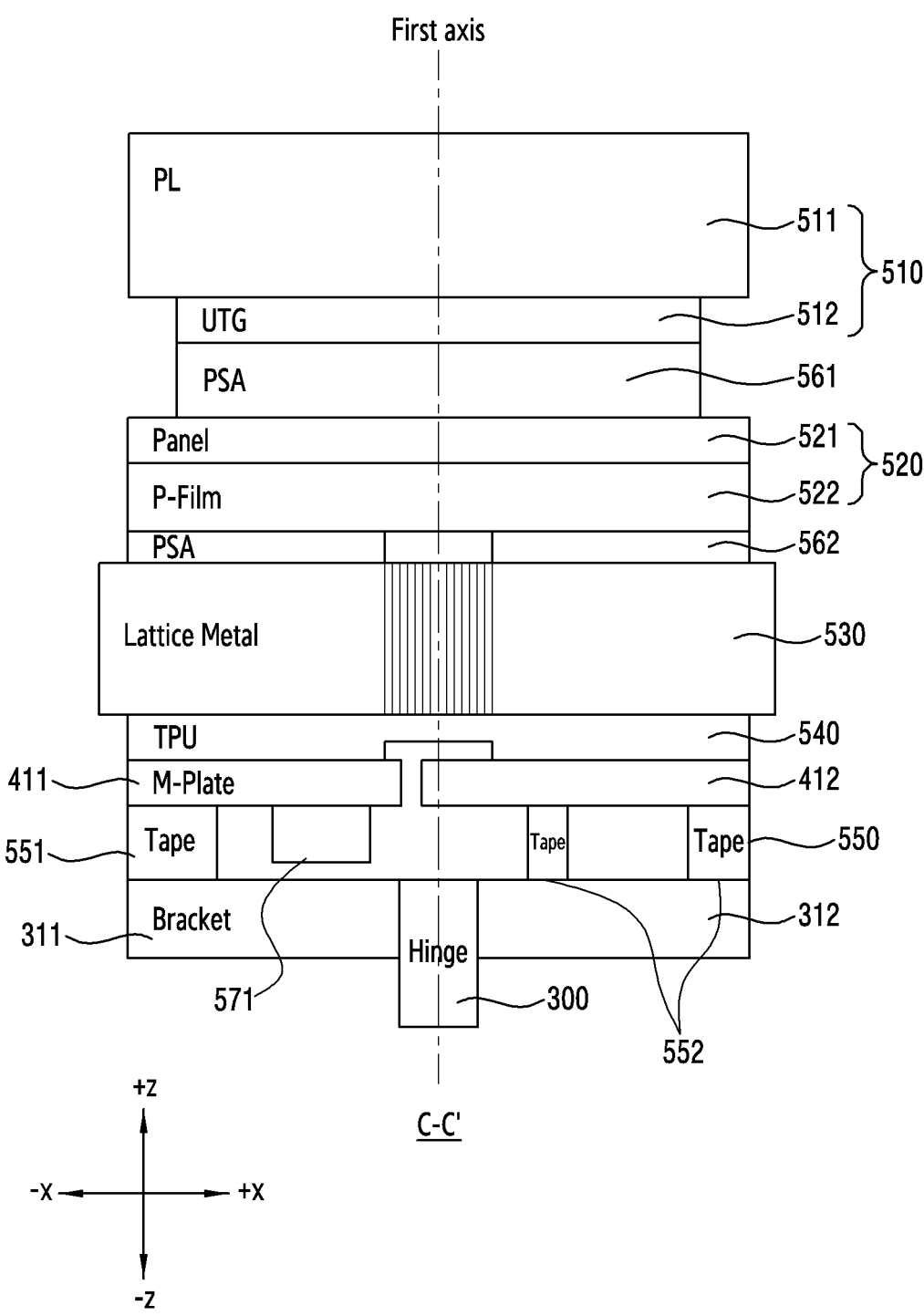
FIG. 5C is a cross-sectional view of the electronic device in FIG. 4, taken along line C-C' according to an embodiment of the disclosure.

FIG. 5C is a cross-sectional view of an electronic device in FIG. 4, taken along line C-C' according to an embodiment of the disclosure.

According to an embodiment, the protrusion 420 on the metal plate 410 in FIG. 5C may be formed in a direction opposite to that of the protrusion 420 on the metal plate 410 in FIG. 5A. For example, the protrusion 420 of the second metal plate 412 in FIG. 5C may be formed in the third direction (e.g., the −x direction).

According to an embodiment, the electronic device 100 in FIG. 5C may include only one first lower material 571, unlike the electronic device 100 having the cross-section B-B' in FIG. 5B.

According to an embodiment, the lower material 570 and the waterproof tape 550 may be formed beneath the first metal plate 411, but, beneath but the second metal plate 412, the lower material 570 may be omitted and only the waterproof tape 550 may be formed. For example, the first lower material 571 and the first waterproof tape 551 may be disposed beneath the first metal plate 411, and the second waterproof tape 552 may be disposed beneath the second metal plate 412.

According to an embodiment, as the first lower material 571 is disposed beneath the first metal plate 411, the first waterproof tape 551 on the cross-section C-C' may be formed as one line. According to an embodiment, as the lower material 570 is omitted beneath the second metal plate 412, the second waterproof tape 552 may be formed as one or more lines.

According to an embodiment, the first waterproof tape 551 disposed beneath the first metal plate 411 may be formed to be thicker than the second waterproof tape 552 disposed beneath the second metal plate 412. According to an embodiment, as the first waterproof tape 551 is formed to be thicker than the second waterproof tape 552, despite the formation of the first waterproof tape 551 of one line beneath the first metal plate 411, the first metal plate 411 may be fixed on the first bracket 311 with substantially the same adhesion as the second metal plate 412.

According to an embodiment, the lower material 570 in FIG. 5C may be substantially the same as the lower material 570 in FIG. 5B.

Referring to FIGS. 5A, 5B, and 5C, a cover panel, a damping layer, and/or a digitizer are not illustrated, but the electronic device 100 may further include the cover panel, the damping layer, and/or the digitizer.

An embodiment including the cover panel, the damping layer, and/or the digitizer will be described in detail later with reference to FIG. 6.

Figure 6:
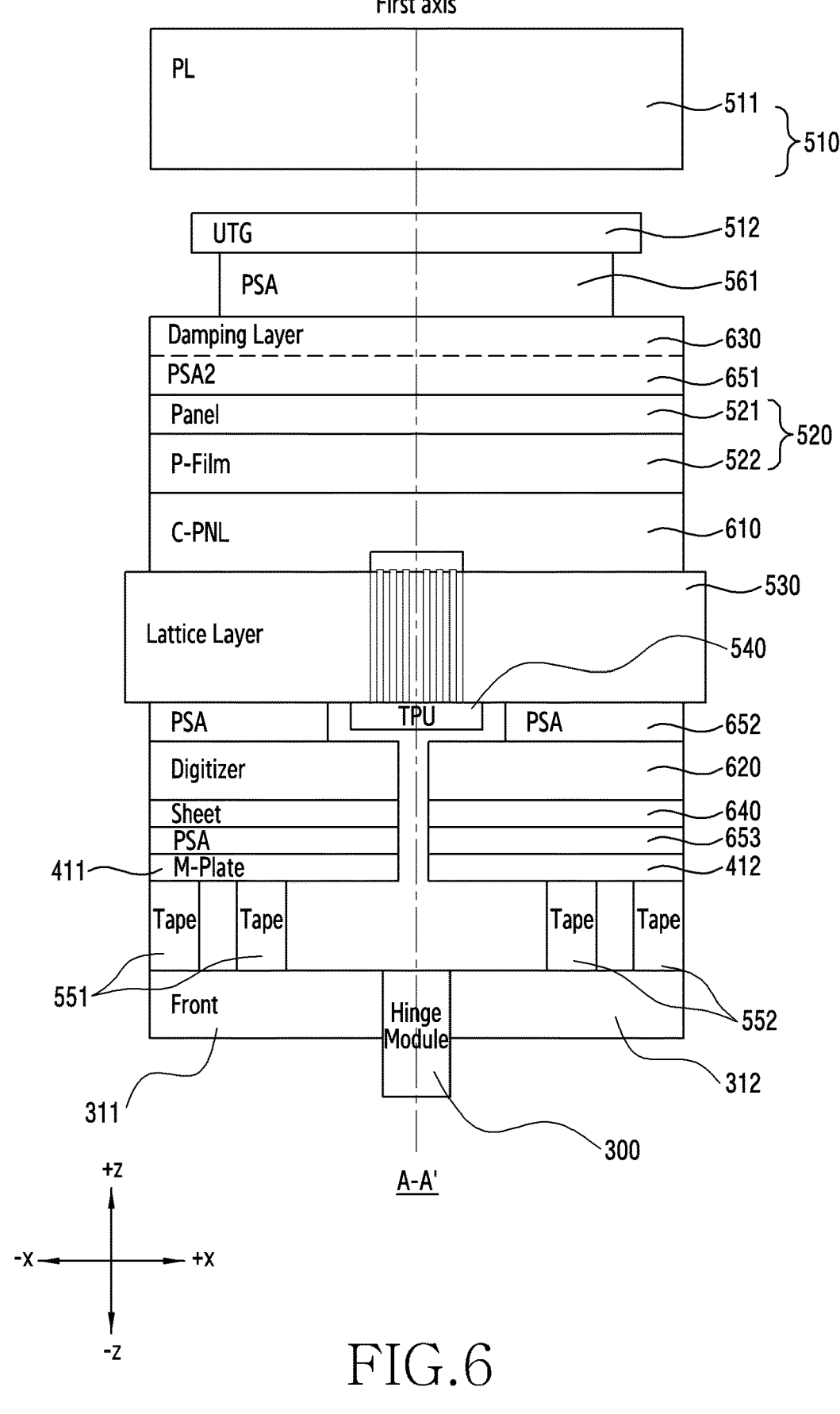
FIG. 6 is a cross-sectional view of the electronic device in FIG. 4, taken along line A-A' according to an embodiment of the disclosure.

FIG. 6 is a cross-sectional view of the electronic device in FIG. 4, taken along line A-A' according to an embodiment of the disclosure.

Referring to FIG. 6, a main display 200 in FIG. 6 may correspond to a main display 200 further including a damping layer 630, a cover panel 610, and/or a digitizer 620 added to the main display 200 in FIGS. 5A to 5C.

According to an embodiment, the damping layer 630 may be formed under the cover glass 510. In an example, the damping layer 630 may be disposed between the cover glass 510 and the display panel 520. According to an embodiment, the damping layer 630 may be attached to the cover glass

510 by the first adhesive layer 561, and may be attached to the panel 521 of the display panel 520 by a second adhesive layer 651 (PSA2).

According to an embodiment, the cover panel 610 may be disposed beneath the display panel 520. According to an embodiment, the cover panel 610 may be attached to the dielectric layer structure 530 by an adhesive (e.g., PSA).

According to an embodiment, the cover panel 610 may be disposed over a first axis. For example, the cover panel 610 may be formed in an area corresponding to the dielectric layer structure 530, but is not limited thereto. For example, the cover panel 610 may be disposed to be formed in an area inside the periphery of the dielectric layer structure 530.

According to an embodiment, one area of the cover panel 610 corresponding to the first axis may be formed to have a smaller thickness in one direction (e.g., a z-direction) than another area of the cover panel 610 spaced apart from the first axis. According to an embodiment, one area of the cover panel 610 corresponding to the first axis is formed thin, and thus the main display 200 may be folded or unfolded.

The cover panel 610 may increase the rigidity of the main display 200. For example, when a shear motion or torsion occurs at the bottom of the main display 200, the cover panel 610 may block the propagation of the shear motion or torsion at the bottom to the display panel 520. According to an embodiment, the shear motion or torsion of the display panel 520 is prevented, and thus the rigidity of the main display 200 may be increased.

According to an embodiment, the electronic device 100 in FIG. 6 may include the cover panel 610 having a reduced thickness compared to the electronic device which does not include the protrusion 420 and the recess 430.

For example, referring to FIGS. 4, and 5A to 5C, the first metal plate 411 and the second metal plate 412 may be coupled to each other in the first state 100A by the protrusion 420 and the recess 430, and thus the shear motion or torsion of the metal plate 410 in the first axis direction (e.g., the +y direction or the −y direction) due to external impact may be reduced.

According to an embodiment, the shear motion or torsion is reduced due to the metal plate 410 having the protrusion 420 and the recess 430, and thus the electronic device 100 may further include the cover panel 610 having a reduced thickness compared to the electronic device which does not include the protrusion 420 and the recess 430.

According to an embodiment, due to the reduction of thickness of the cover panel 610, costs and time for producing the electronic device 100 may be saved, and the electronic device 100 may include the main display 200 with improved creases.

According to an embodiment, unlike the thermoplastic material 540 in FIG. 5A, the thermoplastic material 540 in FIG. 6 may be formed beneath a partial area of the dielectric layer structure 530 corresponding to the first axis. In an example, the thermoplastic material 540 may be disposed beneath a lattice pattern of the dielectric layer structure 530.

According to an embodiment, the digitizer 620 may be disposed under the dielectric layer structure 530 or the thermoplastic material 540. For example, the digitizer 620 may be attached to the dielectric layer structure 530 by a third adhesive layer 652.

According to an embodiment, one area of the digitizer 620 corresponding to the first axis may be cut out. For example, a first area of the digitizer 620 may be disposed on the first metal plate 411, and a second area of the digitizer 620 may be disposed on the second metal plate 412.

According to an embodiment, since the digitizer 620 is formed to be separated in an area corresponding to the first axis, the digitizer 620 may be folded or unfolded without damage when the electronic device 100 is folded or unfolded.

According to an embodiment, the digitizer 620 is a device capable of sensing an input in an x-position and/or a y-position, and may detect a magnetic field-type input device (e.g., an electronic pen). For example, at least one processor (e.g., the processor 1720 in FIG. 17) may provide an electric current to the digitizer 620, and the digitizer 620 may generate a magnetic field. When the electric pen approaches an electromagnetic field of the digitizer 620, an electromagnetic induction phenomenon may occur and a resonant circuit of the electronic pen may generate an electric current. The resonant circuit of the electronic pen may use the generated electric current to form a magnetic field. The at least one processor may detect a position by scanning the intensity of the magnetic field applied from the electronic pen to the digitizer 620 over the entire area. The at least one processor may perform an operation based on the detected position.

According to an embodiment, a shielding sheet 640 (e.g., a copper sheet (Cu sheet)) may be formed beneath the digitizer 620. According to an embodiment, the shielding sheet 640 may be formed in an area corresponding to the digitizer 620. For example, since the digitizer 620 is formed to be separated in the area corresponding to the first axis, the shielding sheet 640 may be formed to be separated in the area corresponding to the first axis.

According to an embodiment, the shielding sheet 640 may be attached to the metal plate 410 by a fourth adhesive layer 653.

According to an embodiment, the metal plate 410 in FIG. 6 may be substantially the same as the metal plate 410 in FIGS. 4, and 5A to 5C.

Figure 7:
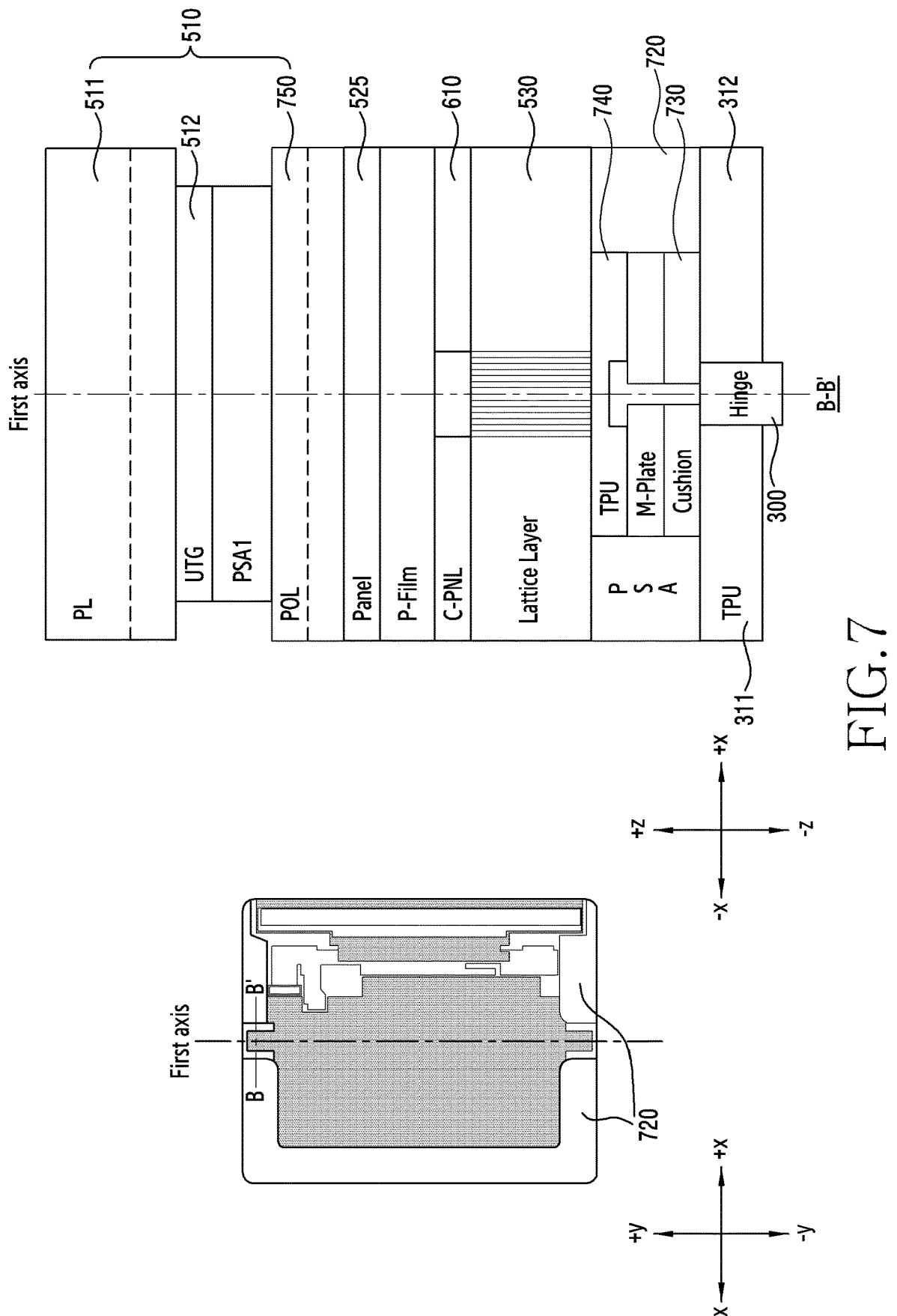
FIG. 7 illustrates the front surface of a metal plate of an electronic device according to an embodiment of the disclosure.

FIG. 7 illustrates the front surface of a metal plate of an electronic device according to an embodiment of the disclosure.

Referring to FIG. 7, an electronic device 100 in FIG. 7 may correspond to an electronic device 100 in which a waterproof tape 550 in FIG. 5A to 5C or 6 is omitted.

According to an embodiment, the dielectric layer structure 530 may be attached to the bracket 310 by a fourth adhesive layer 720. According to an embodiment, the fourth adhesive layer 720 may be disposed on peripheries of the dielectric layer structure 530 and the bracket 310. For example, the fourth adhesive layer 720 may be disposed in an area on the bracket 310 that is spaced apart from a first axis.

According to an embodiment, since the fourth adhesive layer 720 is disposed to be spaced apart from the first axis, a space may be formed between the dielectric layer structure 530, the bracket 310, and the hinge structure 300. In other words, according to an embodiment, since the fourth adhesive layer 720 is disposed to be spaced apart from the first axis, a thermoplastic material 740, a metal plate 710, and a cushion member 730 may be disposed in a space surrounded by the fourth adhesive layer 720, the dielectric layer structure 530, the bracket 310, and the hinge structure 300.

According to an embodiment, the thermoplastic material 740, the metal plate 410, and/or the cushion member 730 may be disposed in the space.

According to an embodiment, the thermoplastic material 740 may be disposed beneath the dielectric layer structure 530. According to an embodiment, the metal plate 710 may be disposed beneath the thermoplastic material 740.

According to an embodiment, the metal plate 710 in FIG. 7 may correspond to substantially the same plate as the metal plate 410 in FIG. 4. That is, the description of the metal plate 410 in FIG. 4 may be applied to the metal plate 710 in FIG. 7.

According to an embodiment, thermoplastic material 740 and the metal plate 710 in FIG. 7 may correspond to substantially the same thermoplastic material and metal plate as the above-mentioned thermoplastic material 540 and metal plate 410 in FIGS. 4, 5A to 5C, and 6.

For example, the metal plate 710 in FIG. 7 may include a protrusion and a recess, and thus may prevent a shear motion or torsion of the metal plate 710 and the main display 200 in a first axis direction (e.g., a +y direction or a −y direction) due to external impact.

According to an embodiment, the cushion member 730 may be disposed beneath the metal plate 710. For example, each cushion member 730 may be disposed between the metal plate 710 and the hinge structure 300 and between the metal plate 710 and the bracket 310.

According to an embodiment, the cushion member 730 may be formed to be cut out in an area corresponding to the first axis. According to an embodiment, since the cushion member 730 is formed to be cut out in an area corresponding to the first axis, the cushion member 730 may be folded or unfolded about the first axis.

According to an embodiment, since the cushion member 730 is disposed beneath the metal plate 710, the electronic device 100 may prevent the metal plate 710 from colliding with the hinge structure 300 while the electronic device 100 is folded or unfolded.

According to an embodiment, the cover glass 510 may further include a polarization plate 750. For example, the polarization plate 750 may be disposed between the transparent plate 512 and a panel 525. According to an embodiment, the polarization plate 750 may be attached to the transparent plate 512 by an adhesive layer (e.g., PSA1).

Figure 8:
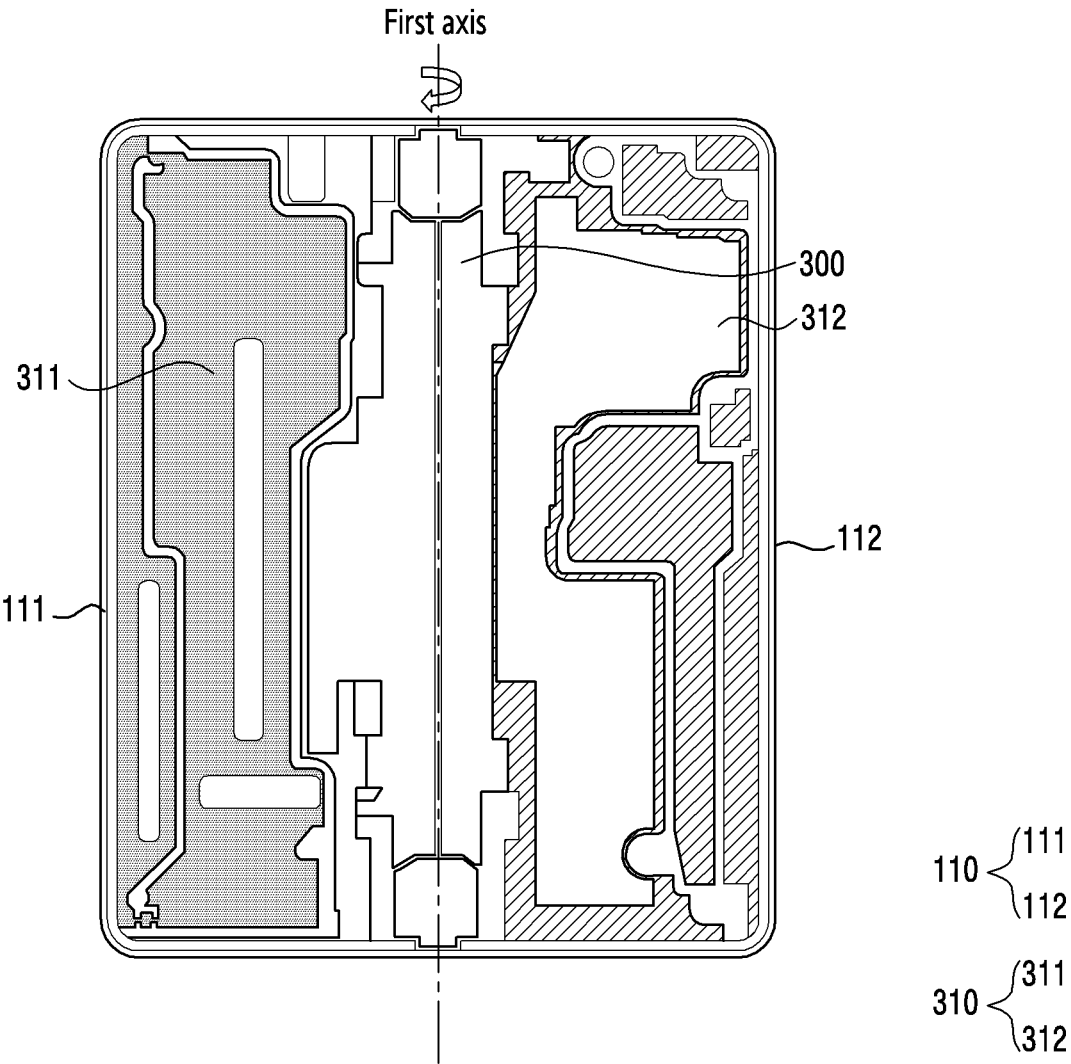
FIG. 8 illustrates the front surface of a hinge plate of an electronic device according to an embodiment of the disclosure.

FIG. 8 illustrates the front surface of a hinge plate of an electronic device according to an embodiment of the disclosure.

According to an embodiment, the electronic device 100 may include the housing 110 forming the exterior of the electronic device 100, the bracket 310 which is disposed in the housing 110 and to which multiple electronic components are mounted, and the hinge structure 300 for rotating the housing 110 of the electronic device 100.

According to an embodiment, the hinge structure 300 may be disposed in an area corresponding to a first axis (e.g., a folding axis). For example, the central axis of the hinge structure 300 may correspond to the first axis, but is not limited thereto. For example, the hinge structure 300 may be folded or unfolded about the first axis. Thus, the electronic device 100 may switch between the folded state 100B and the flat state 100A.

According to an embodiment, the hinge structure 300 may be connected to the first housing 111 and the second housing 112. For example, the hinge structure 300 may connect the first housing 111 to the second housing 112 such that the second housing 112 is rotatable about the first axis with respect to the first housing 111.

According to an embodiment, the hinge structure 300 may be connected to the first bracket 311 fixed in the first housing 111 and the second bracket 312 fixed in the second housing 112. For example, the hinge structure 300 may be connected to the first bracket 311 in the first housing 111 and the second bracket 312 in the second housing 112, and thus the hinge structure 300 may allow the second bracket 312 to rotate about the first axis with respect to the first bracket 311.

According to an embodiment, the bracket 310 including the first bracket 311 and the second bracket 312 may be disposed at both sides with reference to the hinge structure 300 in the housing 110. For example, the first bracket 311 may be disposed in a third direction (e.g., a −x direction) with reference to the hinge structure 300, and the second bracket 312 may be disposed in a second direction (e.g., a +x direction). According to an embodiment, the first battery 451 and/or the speaker module 453 may be disposed in the first bracket 311, and the second battery 452 may be disposed in the second bracket 312.

According to an embodiment, the bracket 310 may be physically connected to the above-mentioned hinge structure 300. Therefore, according to an embodiment, the bracket 310 may be rotated about the first axis by the hinge structure 300. For example, via the hinge structure 300, the second bracket 312 may be rotated about the first axis with respect to the first bracket 311.

Figure 9A:
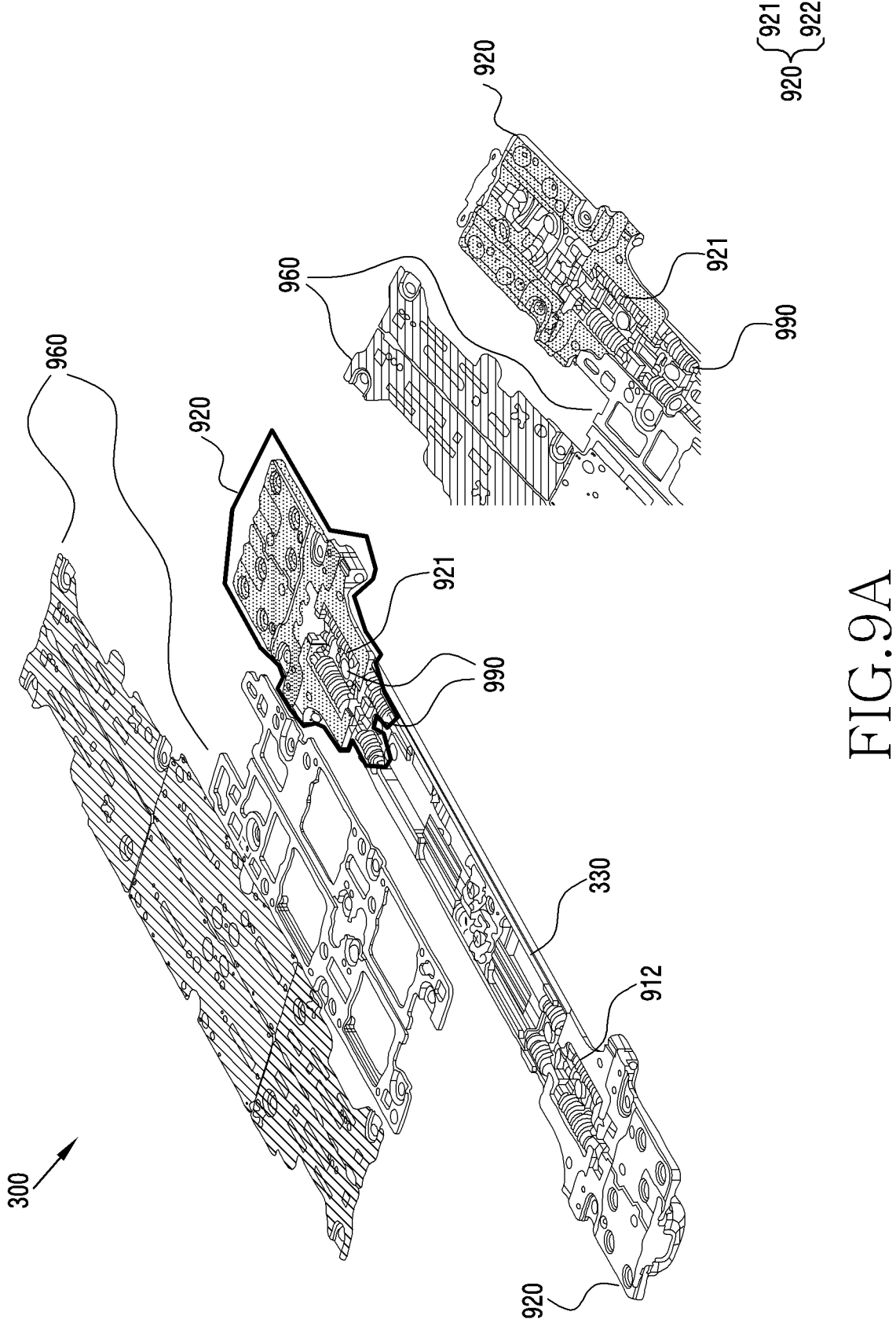
FIG. 9A illustrates a hinge structure of an electronic device according to an embodiment of the disclosure.

FIG. 9A illustrates a hinge structure of an electronic device according to an embodiment of the disclosure.

Referring to FIG. 9A, a hinge structure 300 of an electronic device 100 may include a hinge module 920 connected to each of a first housing 111 and a second housing 112, at least one hinge gear 910 rotating such that the electronic device 100 is capable of being forded or unfolded, a hinge plate 960 at least partially covering a hinge module 920 and the hinge gear 910, a hinge cover 330 supporting at least one element of a hinge structure 300, and/or a fixing screw 990 for coupling the hinge gear 910 and the hinge module 920 to the hinge cover 330.

According to an embodiment, the hinge cover 330 may support the hinge module 920 and the hinge gear 910. For example, at least a part of the hinge module 920 and at least a part of the hinge gear 910 may be disposed on the hinge cover 330, and the hinge cover 330 may support the hinge module 920 and the hinge gear 910.

According to an embodiment, one surface of the hinge cover 330 may be exposed to the outside when the electronic device 100 is in the second state 100B. For example, when the second housing 112 is folded with respect to the first housing 111, one surface of the hinge cover 330 may be exposed outside between the first housing 111 and the second housing 112.

According to an embodiment, at least a part of the hinge cover 330 may be formed of a conductive member. For example, the hinge cover 330 may be formed of a metal member (stainless use steel). However, the disclosure is not limited thereto, and a part of the hinge cover 330 may include a non-conductive member.

According to an embodiment, the at least one hinge gear 910 may correspond to an element for determining an angle at which the electronic device 100 is folded or unfolded.

According to an embodiment, the at least one hinge gear 910 may be disposed in an area corresponding to a first axis. According to an embodiment, the electronic device 100 may be switch to the folded state 100B and the flat state 100A by rotation of the hinge gear 910.

According to an embodiment, the at least one hinge gear 910 may be formed to be vertically symmetric to each other with reference to a second axis. For example, a first hinge gear 911 may be disposed in an upper end direction (e.g., a +y direction) of the electronic device 100 from the second axis of the electronic device 100. For example, the first hinge gear 911 may be disposed in an area on the first axis adjacent to a camera hole (150 in FIG. 1).

In another example, a second hinge gear 912 may be disposed in a lower end direction (e.g., a −y direction) of the electronic device 100 from the second axis of the electronic device 100. For example, the second hinge gear 912 may be disposed in an area on the first axis adjacent to a USB hole (e.g., USB hole 151 in FIG. 1).

According to an embodiment, the first hinge gear 911 and the second hinge gear 912 may be fixed on the hinge cover 330 by the fixing screw 990.

According to an embodiment, the hinge plate 960 may correspond to a plate disposed on the surfaces of the hinge gear 910, the hinge module 920, and the hinge cover 330. For example, a part of the hinge plate 960 may be disposed on the hinge gear 910. In addition, a part of the hinge plate 960 may be disposed on substantially the same plane (e.g., an xy plane) as the hinge gear 910, but is not limited thereto. For example, a part of the hinge plate 960 may be disposed on the hinge gear 910 while forming multiple layers.

According to an embodiment, the hinge plate 960 may be disposed on the front surfaces of the hinge gear 910 and the hinge cover 330, thereby protecting the hinge gear 910 and/or the hinge cover 330.

According to an embodiment, the hinge module 920 may be connected to the hinge gear 910. For example, a part of the hinge module 920 may be physically connected to the hinge gear 910, and thus may be folded or unfolded about the first axis.

Figure 9B:
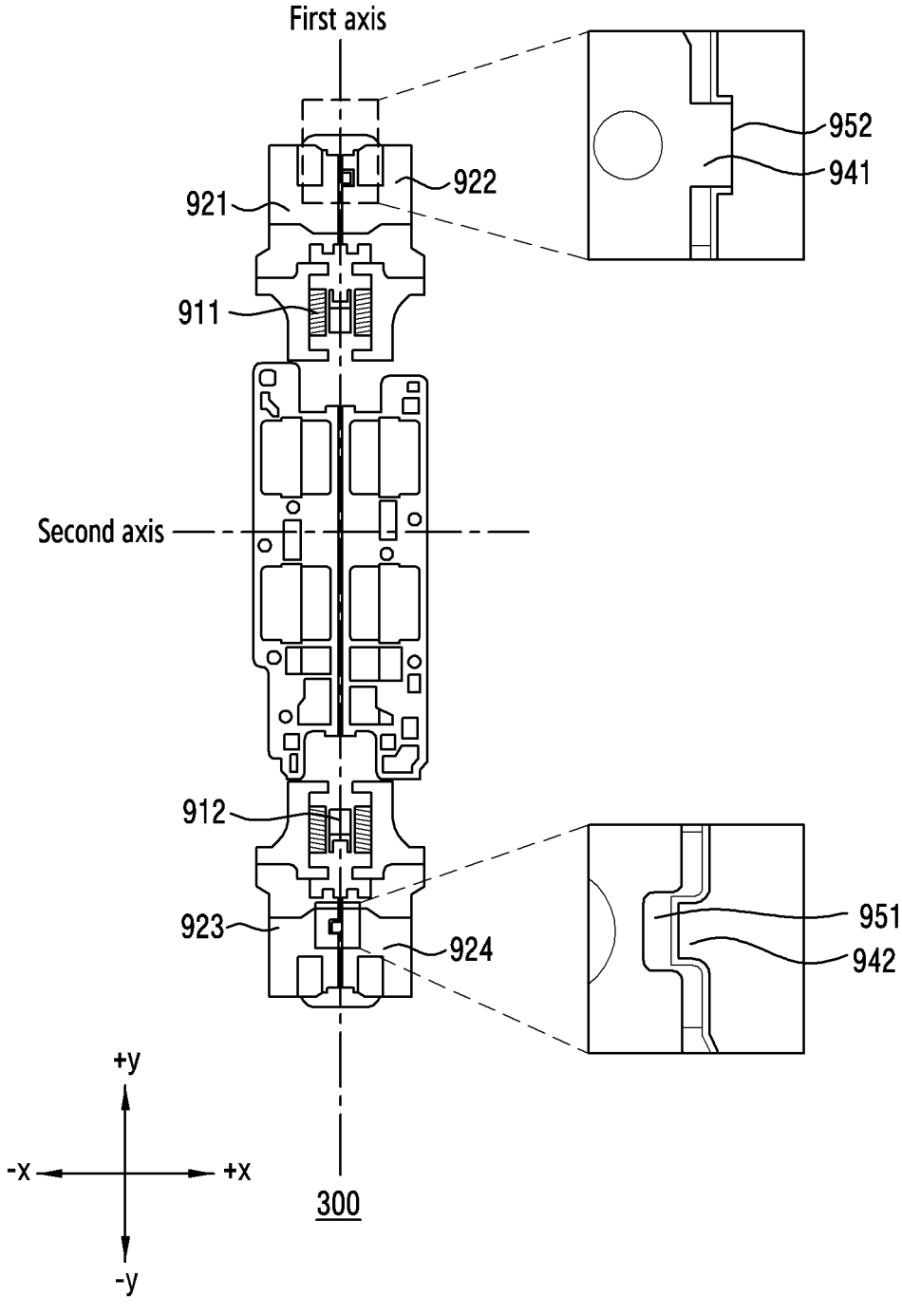
FIG. 9B illustrates a hinge module of a hinge structure according to an embodiment of the disclosure.

FIG. 9B illustrates a hinge module of a hinge structure according to an embodiment of the disclosure.

Referring to FIG. 9B, FIG. 9B illustrates only a hinge module 920 of a hinge structure 300.

According to an embodiment, the hinge module 920 may include a first hinge module 921, a second hinge module 922, a third hinge module 923, and a fourth hinge module 924.

According to an embodiment, the first hinge module 921 and the second hinge module 922 may be disposed in an upper end area of the electronic device 100. For example, the first hinge module 921 and the second hinge module 922 may be disposed in an area on a first axis adjacent to camera hole (150 in FIG. 1) of the electronic device 100.

According to an embodiment, the third hinge module 923 and the fourth hinge module 924 may be disposed in a lower end area of the electronic device 100. For example, the third hinge module 923 and the fourth hinge module 924 may be disposed in an area on the first axis adjacent to a USB hole (151 in FIG. 1) of the electronic device 100.

According to an embodiment, the hinge module 920 may be formed to be horizontally symmetric with reference to the first axis. For example, the first hinge module 921 and the third hinge module 923 may be disposed in a second direction (e.g., a +x direction) with reference to the first axis. According to an embodiment, the second hinge module 922 and the fourth hinge module 924 may be disposed in a third direction (e.g., a −x direction) with reference to the first axis.

In other words, according to an embodiment, the first hinge module 921 and the second hinge module 922 may be formed to be horizontally symmetric to each other with reference to the first axis, and the third hinge module 923 and the fourth hinge module 924 may be formed to be horizontally symmetric to each other with reference to the first axis.

According to an embodiment, the hinge module 920 may be formed to be vertically symmetric with reference to a second axis.

Furthermore, according to an embodiment, the third hinge module 923 and the fourth hinge module 924 may be formed to be symmetric to the first hinge module 921 and the second hinge module 922 with reference to the second axis.

It has been described that the hinge module 920 is symmetric with reference to the first axis and the second axis, but the disclosure is not limited thereto. For example, a part of the first hinge module 921 may be formed to be asymmetric to a part of the second hinge module 922 with reference to the first axis. For example, a first hinge module protrusion 941 may be formed on the first hinge module 921, and a second hinge module recess 952 may be formed on the second hinge module 922.

Furthermore, according to an embodiment, a part of the first hinge module 921 may be formed to be asymmetric to a part of the third hinge module 923 with reference to the second axis. For example, the first hinge module protrusion 941 may be formed on a part of the first hinge module 921, and a first hinge module recess 951 may be formed in a part of the third hinge module 923

According to an embodiment, a part of the hinge module 920 may be connected to the housing 110 of the electronic device 100. For example, the first hinge module 921 and the third hinge module 923 may be connected to the first housing 111 or the first bracket 311 fixed in the first housing 111.

The connection relationship between the hinge module 920 and the housing 110 has been described only for the first hinge module 921, but is not limited thereto. For example, a part of the second hinge module 922 may be connected to the first hinge gear 911, and another part of the second hinge module 922 may be connected to the second housing 112 or the second bracket 312.

According to an embodiment, the connection relationship between the hinge module 920 and the housing 110 may also be applied to the third hinge module 923 and the fourth hinge module 924.

According to an embodiment, due to connection of the hinge gear 910 to the hinge module 920, the hinge module 920 may rotate about the first axis as the hinge gear 910 rotates about the first axis.

According to an embodiment, the hinge module 920 may include at least one hinge module protrusion 940 and at least one hinge module recess 950. For example, the first hinge module 921 may include the first hinge module protrusion 941 extending toward the second hinge module 922 when the electronic device 100 is in the flat state 100A. According to an embodiment, the second hinge module 922 may include the second hinge module recess 952 that receives the first hinge module protrusion 941 and is recessed in a direction opposite to a direction in which the first hinge module 921 is positioned when the electronic device 100 is in the flat state 100A.

According to an embodiment, the hinge module 920 in which the hinge module protrusion 940 and the hinge module recess 950 are formed has been described as the first hinge module 921 and the second hinge module 922, but is not limited thereto. For example, the third hinge module 923 may include the first hinge module recess 951, and the fourth hinge module 924 may include a second hinge module protrusion 942.

According to an embodiment, when viewed from the front surface 101 of the electronic device 100, the hinge module 920 may overlap a part of the metal plate 410. For example, the first hinge module 921 may include the first hinge module protrusion 941 overlapping the first protrusion 421 of the first metal plate 411 when viewed from the front surface 101 of the electronic device 100. For example, the second hinge module 922 may include the second hinge module recess 952 overlapping the second recess 432 of the second metal plate 412 when viewed from the front surface 101 of the electronic device 100.

According to an embodiment, the third hinge module 923 may include the first hinge module recess 951 overlapping the first recess 431 of the first metal plate 411 when viewed from the front surface 101 of the electronic device 100. According to an embodiment, the fourth hinge module 924 may include the second hinge module protrusion 942 overlapping the second protrusion 422 of the second metal plate 412 when viewed from the front surface 101 of the electronic device 100.

According to an embodiment, the hinge module protrusion 940 and the hinge module recess 950 may be formed in the number and shape corresponding those of the protrusion 420 and the recess 430 of the metal plate 410. For example, when the first protrusion 421 and/or a third protrusion 423 are formed on the first metal plate 411, the first hinge module protrusion 941 and/or a third hinge module protrusion (not shown) may be formed on the first hinge module 921 and/or the third hinge module 923.

According to an embodiment, by further forming the hinge module protrusion 940 and the hinge module recess 950, a shear motion or torsion of the metal plate 410 and the hinge module 920 in a first axis direction (e.g., a +y direction or a −y direction) due to external impact may be reduced.

According to an embodiment, as the shear motion or torsion of the metal plate 410 and the hinge module 920 is reduced, the transmission of the shear motion or torsion to the main display 200 on the metal plate 410 may be reduced. According to an embodiment, due to reduction of the shear motion or torsion to the main display 200, the electronic device 100 may prevent the main display 200 from being damaged.

Furthermore, according to an embodiment, since the durability of the main display 200 is ensured, a cover panel (610 in FIG. 6) may be omitted in the electronic device 100. According to an embodiment, since the cover panel 610 is omitted, costs and time for producing the electronic device 100 may be saved.

Figure 10:
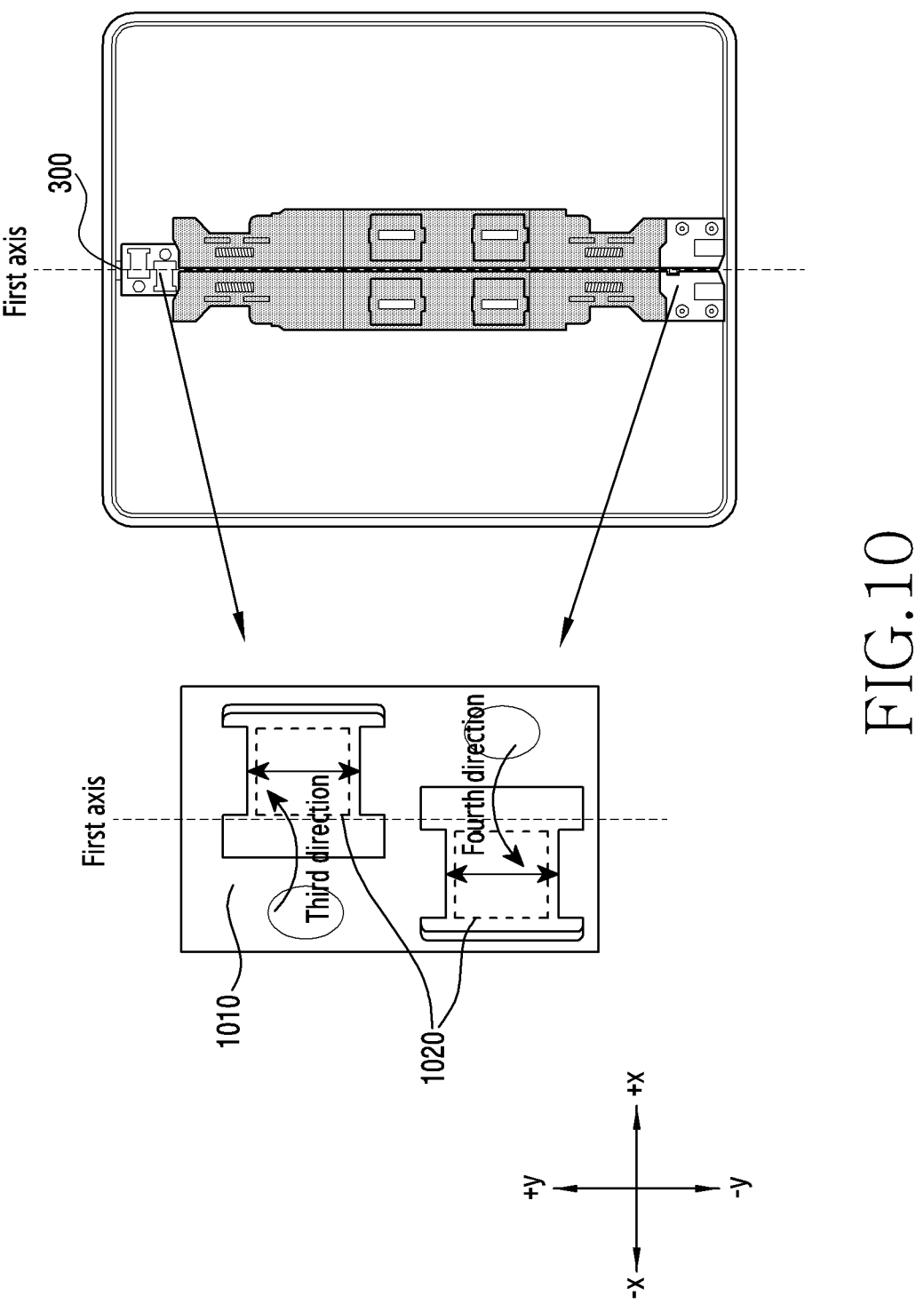
FIG. 10 illustrates a hinge bracket of an electronic device according to an embodiment of the disclosure.

FIG. 10 illustrates a hinge bracket of an electronic device according to an embodiment of the disclosure.

According to an embodiment, the hinge structure 300 may further include a hinge bracket 1010. According to an embodiment, the hinge bracket 1010 may be disposed on the rear surface of the hinge module 920 when the electronic device 100 is in the flat state 100A.

For example, when the electronic device 100 is in the flat state 100A, the hinge bracket 1010 may be disposed on the rear surfaces of the first hinge module 921 and the second hinge module 922 and/or the rear surfaces of the third hinge module 923 and the fourth hinge module 924.

According to an embodiment, when the hinge module 920 and/or the metal plate 410 is rotated about a first axis by the hinge gear 910, the hinge bracket 1010 may have a guide hole 1020 which performs guiding such that the hinge module protrusion 940 of the hinge module 920 and the protrusion 420 of the metal plate 410 can be inserted the guide hole and rotated in a predetermined direction.

For example, the metal plate 410 and/or the hinge module 920 may rotate in a third direction (e.g., a clockwise direction) or a fourth direction (e.g., a counterclockwise direction) in FIG. 10. According to an embodiment, when the metal plate 410 and/or the hinge module 920 rotates in the third direction, the protrusion 420 or the hinge module protrusion 940 may be inserted into the guide hole 1020 and may rotate in the third direction. For example, when the first metal plate 411 and/or the third hinge module 923 rotates in the third direction, the guide hole 1020 may guide the first protrusion 421 and/or the first hinge module protrusion 941 inserted into the guide hole 1020 to uniformly rotate in the third direction.

It has been described that the metal plate 410 and/or hinge module 920 rotates in the third direction, but the disclosure is not limited thereto. The metal plate 410 and/or the hinge module 920 may rotate in the fourth direction. According to an embodiment, when the metal plate 410 and/or the hinge module 920 rotates in the fourth direction, the guide hole 1020 may guide the protrusion 420 and/or the hinge module protrusion 940 inserted into the guide hole 1020 to uniformly rotate in the fourth direction.

According to an embodiment, since the hinge bracket 1010 having the guide hole 1020 is included, the protrusion 420 and the hinge module protrusion 940 may be prevented from colliding with other electronic components when the electronic device 100 switches from the first state 100A to the second state 100B.

Specific embodiments about the guide hole 1020 of the hinge bracket 1010 and the protrusion 420 will be described later in detail with reference to FIGS. 11 and 12.

Figure 11:
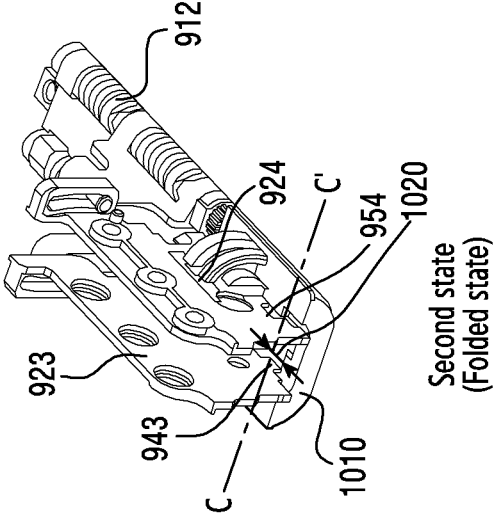
FIG. 11 illustrates a hinge bracket of an electronic device according to an embodiment of the disclosure.
Figure 11:
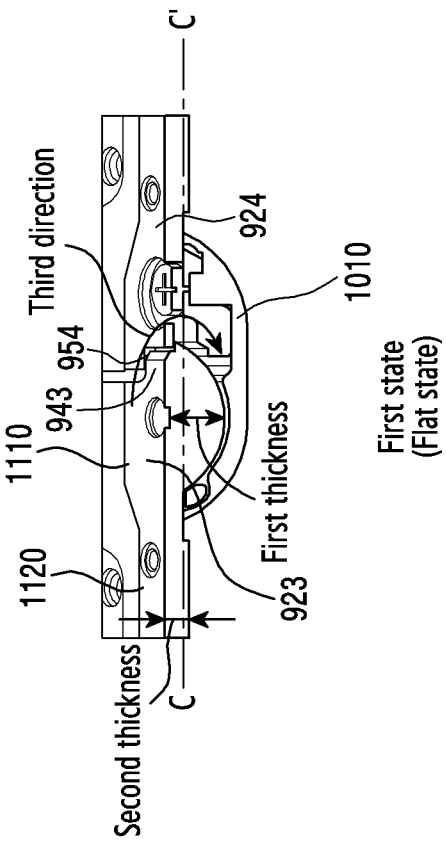

FIG. 11 illustrates a hinge bracket of an electronic device according to an embodiment of the disclosure.

Referring to FIG. 11, it is possible to identify a relationship between a guide hole 1020 and a hinge module protrusion 940 when an electronic device 100 according to an embodiment is in a first state 100A and a second state 100B.

According to an embodiment, the hinge module 920 may be disposed on the front surface of the hinge bracket 1010. For example, when the electronic device 100 is in the first state 100A, the hinge module 920 may be disposed to face the hinge bracket 1010. Furthermore, according to an embodiment, when the electronic device 100 is in the second state 100B, the hinge module 920 may be disposed perpendicular to the hinge bracket 1010 or toward a first direction (e.g., a −z direction in FIG. 11). Furthermore, according to an embodiment, the third hinge module 923 may be disposed to face the second direction (e.g., a +x direction), and the fourth hinge module 924 may be disposed to face a third direction (e.g., a −x direction).

According to an embodiment, when the electronic device 100 switches from the first state 100A to the second state 100B, the hinge module 920 may rotate about the first axis while an angle formed between the hinge module 920 and the hinge bracket 1010 gradually increases.

According to an embodiment, the third hinge module 923 may further include a third hinge module protrusion 943, and the fourth hinge module 924 may further include a fourth hinge module recess 954 for receiving the third hinge module protrusion 943.

According to an embodiment, when the electronic device 100 is in the first state 100A, the third hinge module protrusion 943 of the third hinge module 923 may be received in the fourth hinge module recess 954 of the fourth hinge module 924. Furthermore, when the electronic device 100 is in the second state 100B, the third hinge module protrusion 943 of the third hinge module 923 may be inserted into the guide hole 1020 formed in the hinge bracket 1010.

According to an embodiment, when the electronic device 100 switches from the first state 100A to the second state 100B, the third hinge module protrusion 943 of the third hinge module 923 may move a third direction (a clockwise direction). According to an embodiment, in the process in which the third hinge module protrusion 943 moves in the third direction (the clockwise direction), the third hinge module protrusion 943 may be inserted into the guide hole 1020 of the hinge bracket 1010 and may uniformly move in the third direction along the guide hole 1020.

According to an embodiment, in the second state 100B, the third hinge module protrusion 943 may remain inserted into the guide hole 1020.

According to an embodiment, since the guide hole 1020, the electronic device 100 may prevent the protrusion 420 and the hinge module protrusion 940 from colliding with other electronic component while the electronic device 100 switches from the first state 100A to the second state 100B.

Furthermore, according to an embodiment, when the electronic device 100 is in the second state 100B, the protrusion 420 and the hinge module protrusion 940 may be received in the guide hole 1020, the electronic device 100 may prevent the metal plate 410 from shaking in a first axis direction (e.g., a +y direction or a −y direction) in the second state 100B.

According to an embodiment, a part of a first hinge area 1110 adjacent to the third hinge module protrusion 943 of the hinge module 920 may be formed to be thicker than a second hinge area 1120 spaced apart from the third hinge module protrusion 943 of the hinge module 920. For example, a part of the first hinge area 1110 of the hinge module 920 may have a first thickness, and the second hinge area 1120 may have a second thickness. According to an embodiment, the first thickness may be greater than the second thickness.

According to an embodiment, the first thickness of the first hinge area 1110 of the hinge module 920 is formed to be greater than the second thickness of the second hinge area 1120 of the hinge module 920, and thus the third hinge module protrusion 943 of the electronic device 100 may be prevented from being damaged.

Figure 12:
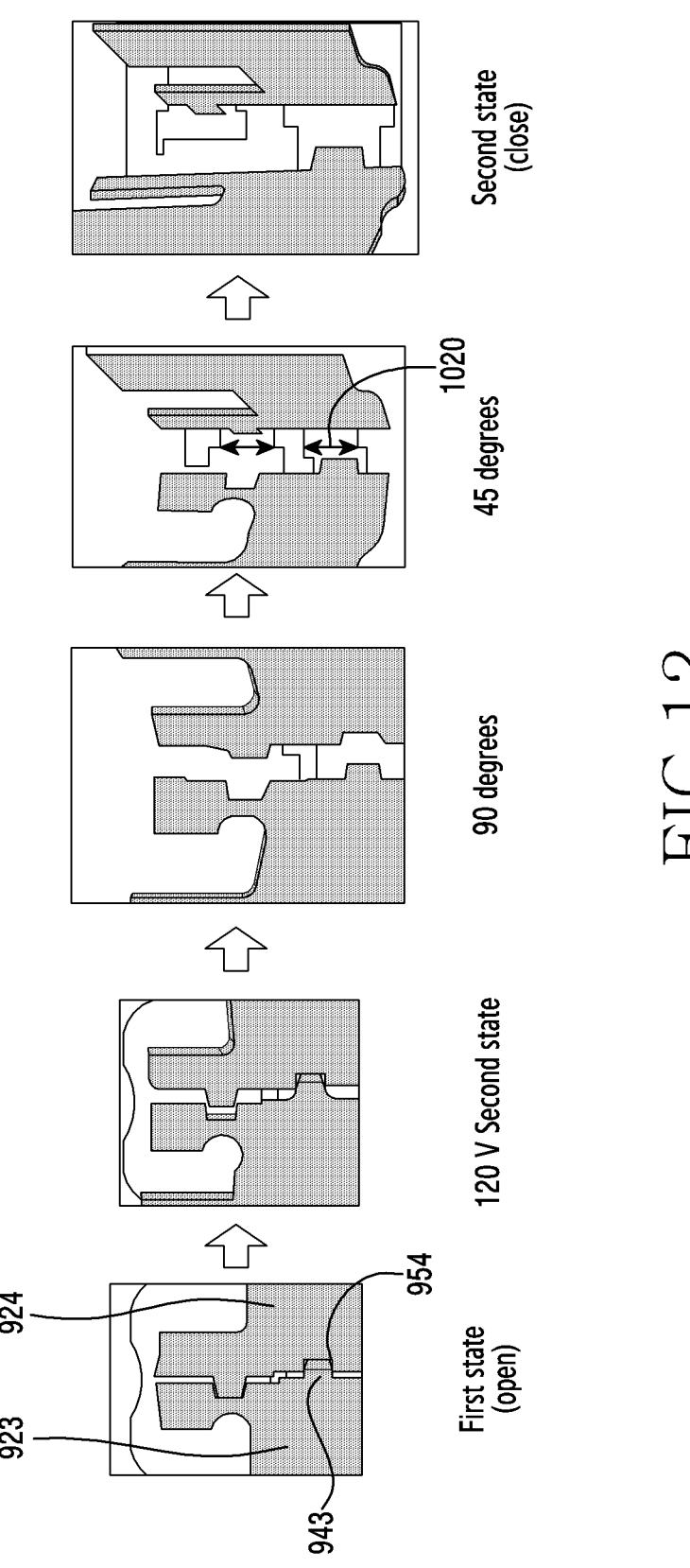
FIG. 12 illustrates a hinge bracket of an electronic device according to an embodiment of the disclosure.

FIG. 12 illustrates a hinge bracket of an electronic device according to an embodiment of the disclosure.

Referring to FIG. 12, when an electronic device 100 switches from a flat state 100A to a folded state 100B, a protrusion 420 of a metal plate 410 and/or a hinge module protrusion 940 of a hinge module 920, received in a guide hole 1020, may be received in a guide hole 1020.

According to an embodiment, when the hinge gear 910 rotates, the third hinge module 923 and the fourth hinge module 924 may rotate about a first axis.

Referring to FIG. 12 according to an embodiment, when the third hinge module 923 and the fourth hinge module 924 rotates about the first axis, an angle formed by the third hinge module 923 and the fourth hinge module 924 may be 180 to 0 degrees. For example, the angle formed by the third hinge module 923 and the fourth hinge module 924 may be 120 degrees, 90 degrees, or 45 degrees, but is not limited thereto. For example, the angle formed by the third hinge module 923 and the fourth hinge module 924 may be 30 degrees.

According to an embodiment, when the angle formed by the third hinge module 923 and the fourth hinge module 924 is changed from 180 degrees to 0 degrees, the third hinge module protrusion 943 of the third hinge module 923 may be inserted into the guide hole 1020 of the hinge bracket 1010.

According to an embodiment, in the flat state 100A (the first state) or 180 degrees, the third hinge module protrusion 943 of the third hinge module 923 may be received in the second hinge module recess 952 of the fourth hinge module 924.

According to an embodiment, when the flat state 100A (the first state) or 180 degrees is changed to the folded state 100B or 0 degrees, the third hinge module protrusion 943 of the third hinge module 923 may be inserted into the guide hole 1020 of the hinge bracket 1010 and may uniformly rotate in the rotation direction. In other words, according to an embodiment, the guide hole 1020 of the hinge bracket 1010 may guide the third hinge module protrusion 943 to uniformly rotate in the rotation direction.

According to an embodiment, in the folded state 100B (the second state) or 0 degrees, the third hinge module 923 and the fourth hinge module 924 may be disposed to face each other, the third hinge module protrusion 943 of the third hinge module 923 may be inserted into the guide hole 1020 of the hinge bracket 1010.

According to an embodiment, in FIG. 12, the hinge module protrusion 940 received in the guide hole 1020 of the hinge bracket 1010 has been described as the third hinge module protrusion 943. However, this is only an example for convenience, and the disclosure is not limited to the third hinge module protrusion 943. For example, at least one hinge module protrusion 940, formed on the first hinge module 921, the second hinge module 922, and/or a fourth hinge module 924, may be received in the guide hole 1020 of the hinge bracket 1010 when the electronic device 100 switches from the flat state 100A to the folded state 100B.

Furthermore, according to an embodiment, the description has been made of an example in which the hinge module protrusion 940 of the hinge module 920 is received in the guide hole 1020. However, the disclosure is not limited thereto, and the protrusion 420 of the metal plate 410 may be received in the guide hole 1020.

Figure 13:
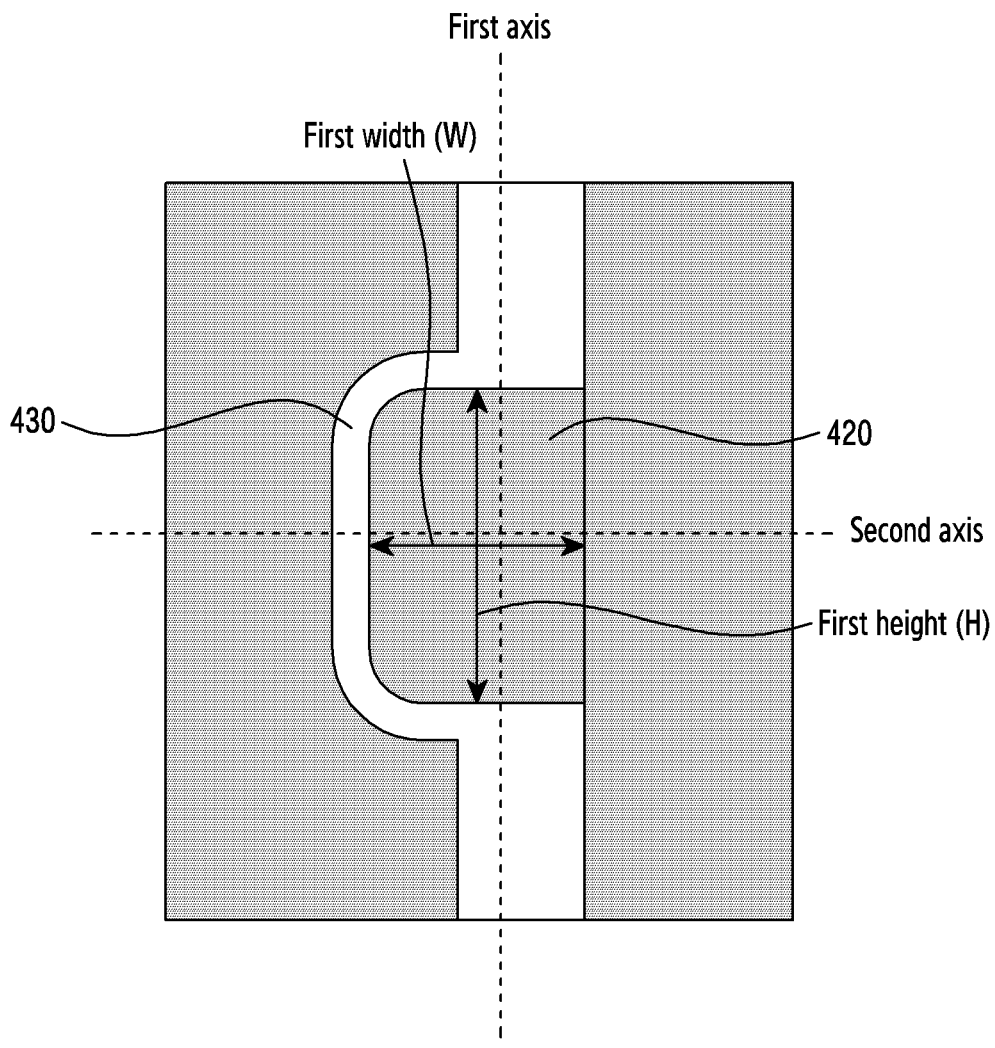
FIG. 13 illustrates a protrusion of a metal plate according to an embodiment of the disclosure.

FIG. 13 illustrates a protrusion of a metal plate according to an embodiment of the disclosure.

Referring to FIG. 13, a protrusion 420 of a metal plate 410 may have a first height (H) and a first width (W).

According to an embodiment, the first height (H) of the protrusion 420 may imply a length extending a first axis direction (e.g., a +y direction or a −y direction). According to an embodiment, the first width (W) of the protrusion 420 may imply a length extending in a second axis direction (e.g., a +x direction or a −x direction).

According to an embodiment the first height (H) of the protrusion 420 may be formed to be longer than the first width (W) of the protrusion 420.

According to an embodiment, when the first height (H) is formed to be longer than or equal to the first width (W), the protrusion 420 may not be separated from the metal plate 410 even when impact is applied from the outside. In other words, according to an embodiment, the first height (H) is formed to be longer than or equal to the first width (W), and thus the durability of the protrusion 420 may be increased.

According to an embodiment, the protrusion 420, in which the first height (H) is equal to or longer than the first width (W), may ensure more increased durability than the protrusion in which the first height (H) is shorter than the first width (W).

Figure 14:
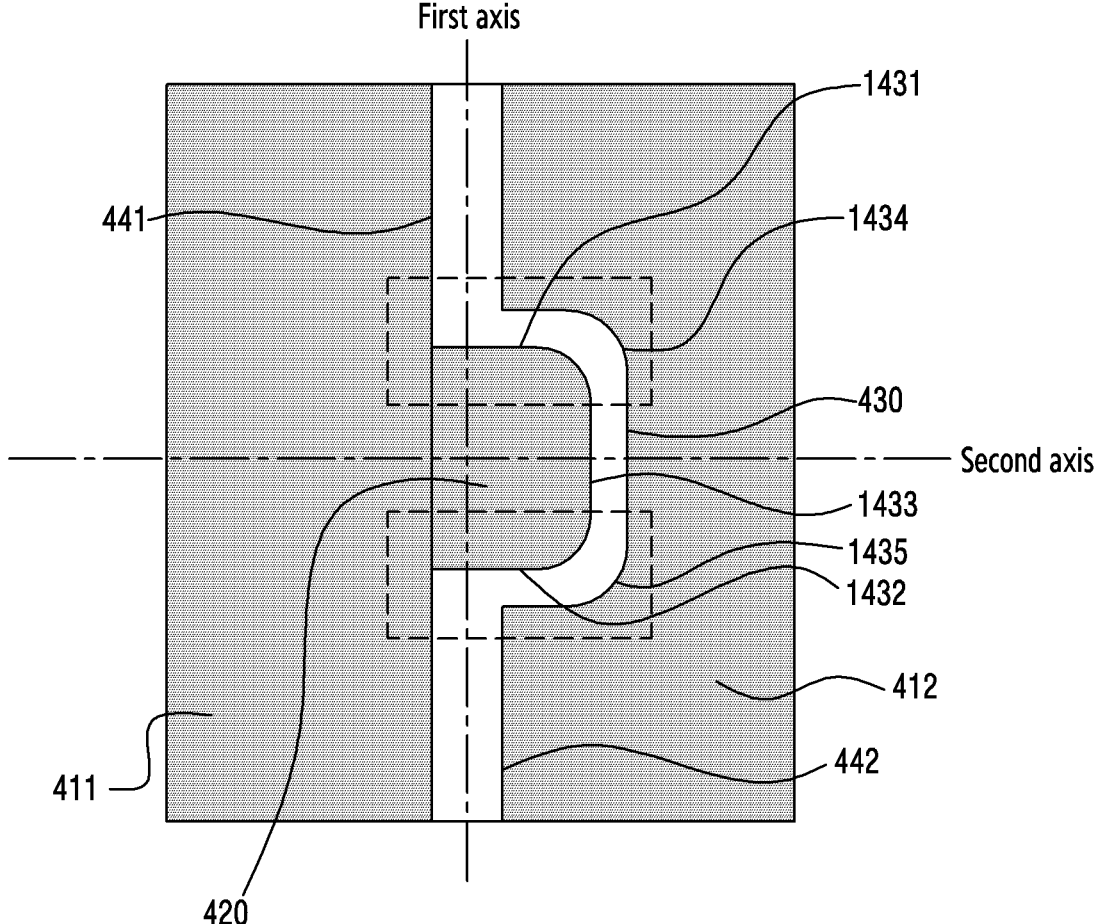
FIG. 14 illustrates a protrusion of an electronic device according to an embodiment of the disclosure.

FIG. 14 illustrates a protrusion of an electronic device according to another embodiment of the disclosure.

Referring to FIG. 14, a protrusion 420 of a metal plate 410 may be formed in various shapes. According to an embodiment, the protrusion 420 may be formed in a rectangular shape, but is not limited thereto. For example, the protrusion 420 may be formed in a semicircle shape or a triangle shape.

Alternatively, according to an embodiment, the protrusion 420 may be formed in a trapezoidal shape. For example, the protrusion 420 may extend from one point of the peripheries 440 of the metal plate 410. According to an embodiment, the protrusion 420 may include a first edge 1431 extending the peripheries 440, a second edge 1432 opposite to the first edge 1431 with respect to a second axis, and/or a third edge 1433 for connecting the first edge 1431 to the second edge 1432.

According to an embodiment, the first edge 1431 may extend from one point of the peripheries 440 toward a second axis. According to an embodiment, the first edge 1431 may be symmetric to the second edge 1432 with reference to the second axis. According to an embodiment, the third edge 1433 may correspond to an edge parallel to the peripheries 440 of the metal plate 410.

According to an embodiment, the first edge 1431 and the second edge 1432 of the protrusion 420 may form a predetermined angle with reference to the first axis, may extend toward the second axis, and may be connected to the third edge 1433. In other words, the first edge 1431 and the second edge 1432 may extend with a predetermined slope, and may be connected to the third edge 1433.

According to an embodiment, the first edge 1431 and the second edge 1432 of the protrusion 420 have the slope and are connected to the third edge 1433, and thus the boundary surface of the recess 430 for receiving the protrusion 420 may also be formed with a slope. For example, a fourth edge 1434 of the recess 430 facing the first edge 1431 of the protrusion 420 and a fifth edge 1435 of the recess 430 facing the second edge 1432 may be formed with a slope corresponding to the slope of the first edge 1431 and the second edge 1432.

According to an embodiment, the first edge 1431, the second edge 1432, the fourth edge 1434, and the fifth edge 1435 are formed with predetermined slopes, and thus the durability of the protrusion 420 may be increased.

Figure 15:
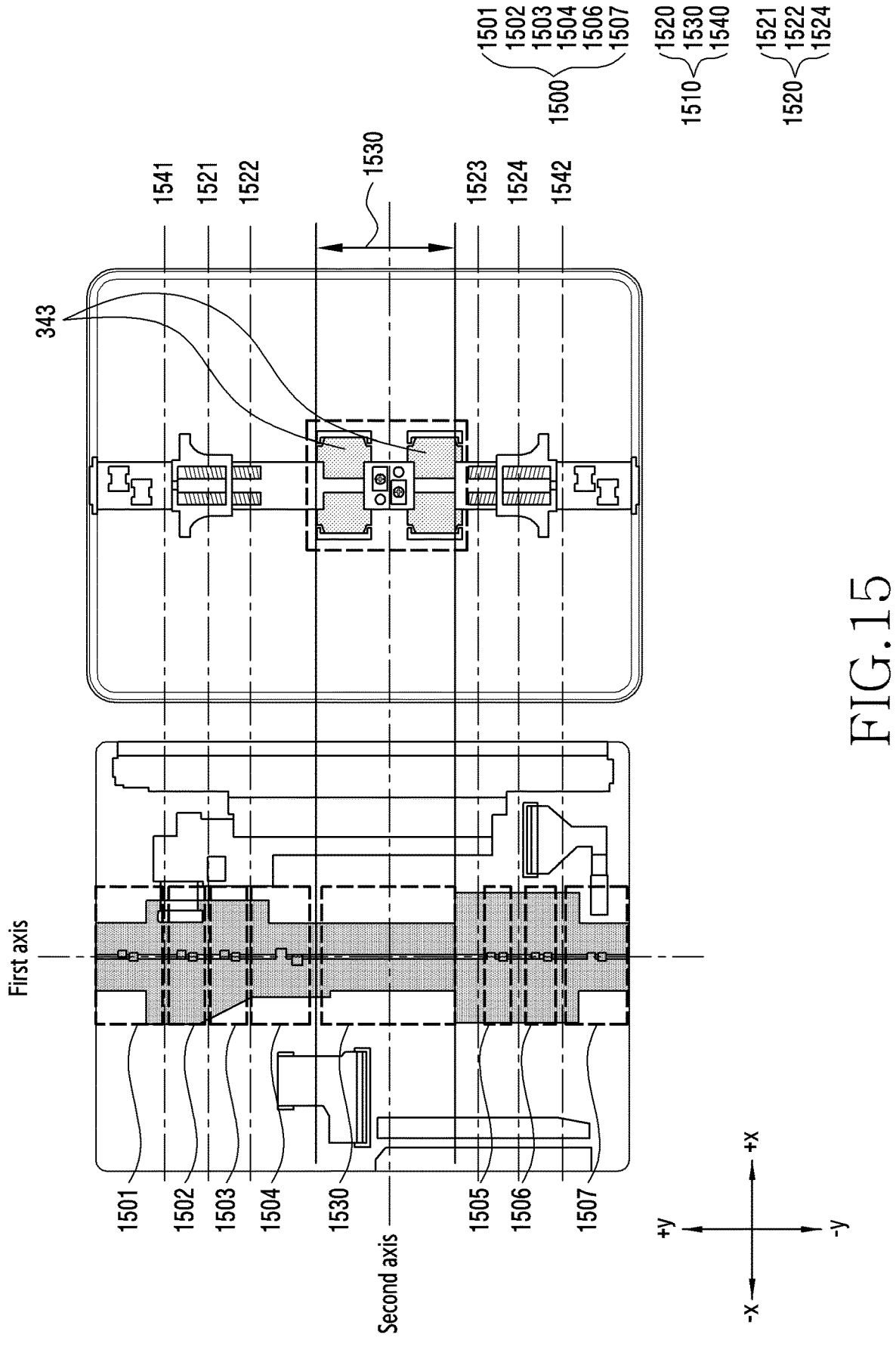
FIG. 15 illustrates the front surface of a metal plate of an electronic device according to an embodiment of the disclosure.

FIG. 15 illustrates a front surface of a metal plate of an electronic device according to an embodiment of the disclosure.

Referring to FIG. 15, a metal plate 410 may include first multiple areas 1500, and a hinge structure 300 may include second multiple areas 1510.

According to an embodiment, the first multiple areas 1500 may imply areas on the metal plate 410 in which the protrusion 420 and the recess 430 are formed. Furthermore, according to an embodiment, the second multiple areas 1510 may imply areas in which multiple elements (e.g., the hinge gear (910 in FIGS. 9A and 9B) of the hinge structure 300.

According to an embodiment, the electronic device 100 may include the hinge structure 300 disposed in an area corresponding to a first axis, and a flexible printed circuit board (FPCB) 343 passing through the hinge structure 300.

According to an embodiment, the second multiple areas 1510 of the hinge structure 300 may include a screw fastening area 1520 to which a screw connecting the hinge structure 300 to the bracket 310 is fastened, a center area 1530 through which the FPCB 343 of the electronic device 100 passes, and/or a hinge gear area 1540 in which the hinge gear 910 is disposed.

According to an embodiment, the FPCB 343 may electrically connect a first electronic component (not shown) disposed in the first housing 111 to a second electronic component disposed in the second housing 112. For example, the FPCB 343 may pass through the center area 1530 of the hinge structure 300 to electrically connect the first electronic component disposed in the first housing 111 to the second electronic component disposed in the second housing 112. According to an embodiment, the center area 1530 of the hinge structure 300 may correspond to an area corresponding to a second axis, but is not limited thereto.

According to an embodiment, the hinge gear area 1540 may include a first hinge gear area 1541 in which the first hinge gear 911 is disposed, and a second hinge gear area 1542 in which the second hinge gear 912 is disposed.

According to an embodiment, the first hinge gear area 1541 may be formed in one area of the hinge structure 300 positioned in a first direction (e.g., a +y direction) with reference to the second axis. According to an embodiment, the second hinge gear area 1542 may be formed in one region of the hinge structure 300 positioned in a second direction (e.g., a −y direction) opposite to the first direction with reference to the second axis.

According to an embodiment, the first hinge gear area 1541 may be formed to be symmetric to the second hinge gear area 1542 with reference to the second axis, but is not limited thereto.

According to an embodiment, the screw fastening area 1520 may include a first screw fastening area 1521 which is adjacent to the first hinge gear area 1541 and to which a screw is fastened, a second screw fastening area 1522 to which the screw is fastened between the first screw fastening area 1521 and the center area 1530, a third screw fastening area 1523 to which a screw is fastened between a fourth screw fastening area 1524 and the center area 1530, and/or the fourth screw fastening area 1524 which is adjacent to the second hinge gear area 1542 and to which a screw is fastened.

According to an embodiment, the first screw fastening area 1521 and/or the second screw fastening area 1522 may be formed in one area of the hinge structure 300 positioned in the first direction (e.g., the +y direction) with reference to the second axis. According to an embodiment, the third screw fastening area 1523 and/or the fourth screw fastening area 1524 may be formed in one area of the hinge structure 300 positioned in the second direction (e.g., the −y direction) with reference to the second axis.

According to an embodiment, the first screw fastening area 1521 and the fourth screw fastening area 1524 may be formed to be symmetric to each other with reference to the second axis, and the second screw fastening area 1522 and the third screw fastening area 1523 may be formed to be symmetric to each other with reference to the second axis. However, the disclosure is not limited thereto.

According to an embodiment, the protrusion 420 and the recess 430 in FIG. 4 may be formed in the first multiple areas 1500 of the metal plate 410.

According to an embodiment, the first multiple areas 1500 formed on the metal plate 410 may be formed to be spaced apart from the second multiple areas 1510 formed in the hinge structure 300.

According to an embodiment, the first multiple areas 1500 may include a first area 1501 and a seventh area 1507 formed between the hinge gear area 1540 of the hinge structure 300 and the side surface 103 of the electronic device 100. For example, the first area 1501 may be spaced apart from the first hinge gear area 1541 and formed between the first hinge gear area 1541 and the side surface 103 of the electronic device 100. According to an embodiment, the seventh area 1507 may be spaced apart from the second hinge gear area 1542 and formed between the second hinge gear area 1542 and the side surface of the housing 110.

In other words, according to an embodiment, the first area 1501 and/or the seventh area 1507 may formed in an area adjacent to the periphery of the metal plate 410.

According to an embodiment, the metal plate 410 the first multiple areas 1500 may further include a second area 1502 formed between the first hinge gear area 1541 and the first screw fastening area 1521, a third area 1503 formed between the first screw fastening area 1521 and the second screw fastening area 1522, a fourth area 1504 formed between the second screw fastening area 1522 and the center area 1530, a fifth area 1505 formed between the third screw fastening area 1523 and the fourth screw fastening area 1524, and/or a sixth area 1506 and the fourth screw fastening area 1524 and the second hinge gear area 1542.

For example, the first hinge gear area 1541 may be formed between the first area 1501 and the second area 1502, and the second hinge gear area 1542 may be formed between the sixth area 1506 and the seventh area 1507.

According to an embodiment, the protrusion 420 and the recess 430 in FIG. 4 may be formed in at least one of the first area 1501 to the seventh area 1507. For example, the protrusion 420 and the recess 430 may be formed in the first area 1501, the second area 1502, and/or the third area 1503. In another example, the protrusion 420 and the recess 430 may be formed in the first area 1501 and the seventh area 1507.

According to an embodiment, the at least one protrusion 420 and the recess 430 are formed in the first multiple areas 1500 of the metal plate 410, and thus a shear motion or torsion of the metal plate 410 in a first axis direction (e.g., a +y direction or a −y direction) due to external impact may be reduced compared with the case in which the protrusion 420 and the recess 430 is formed in a single area.

According to an embodiment, the shear motion or torsion of the metal plate 410 is reduced, and thus a shear motion or torsion of the main display 200 disposed on the metal plate 410 may also be reduced. According to an embodiment, the shear motion or torsion of the main display 200 is reduced, and thus damage to an area of the main display 200 corresponding to the first axis may be prevented.

Figure 16:
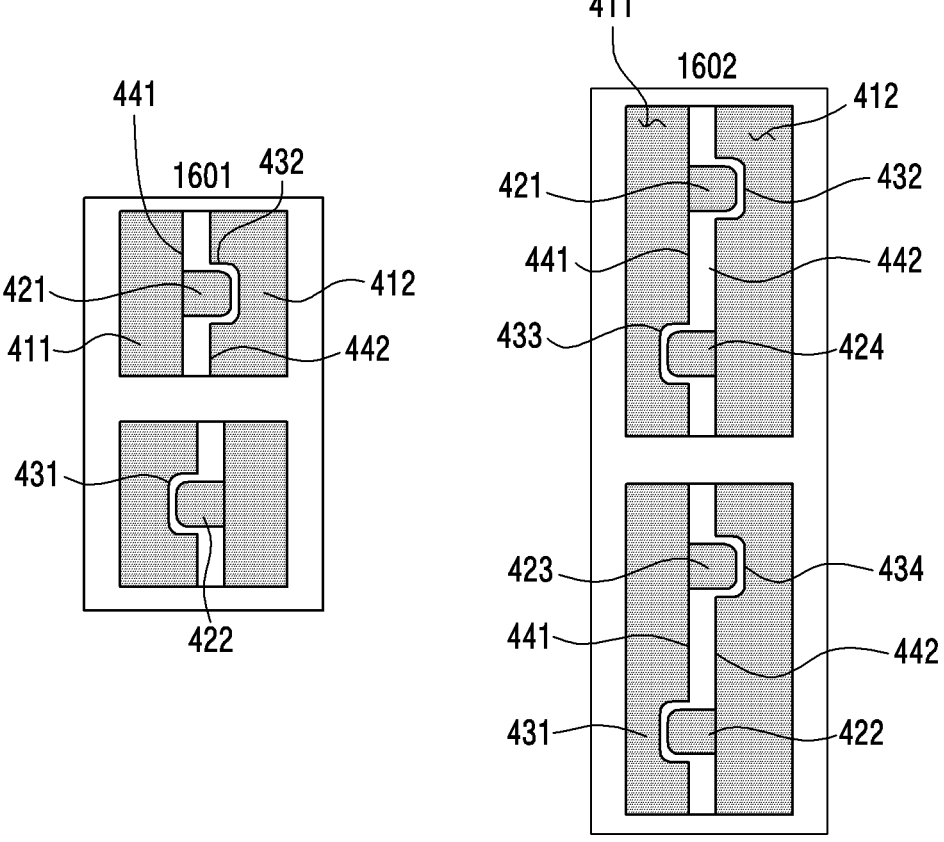
FIG. 16 illustrates a protrusion of an electronic device according to an embodiment of the disclosure.

FIG. 16 illustrates a protrusion of an electronic device according to another embodiment of the disclosure.

Referring to FIG. 16, multiple protrusions 420 and multiple recesses 430 may be formed on a metal plate 410.

Referring to diagram 1601 according to an embodiment, the first metal plate 411 may include a first protrusion 421 and a first recess 431, and the second metal plate 412 may include a second protrusion 422 and a second recess 432.

The protrusion 420 and the recess 430 in diagram 1601 may be substantially identical to the protrusion 420 and the recess 430 in FIG. 4.

Referring to diagram 1602 according to an embodiment, the first metal plate 411 may further include a third recess 433 adjacent to the first protrusion 421 and recessed from the first periphery 441, and a third protrusion 423 adjacent to the first recess 431 and extending from the first periphery 441. Furthermore, according to an embodiment, the second metal plate 412 may further include a fourth protrusion 424 extending from the second periphery 442 and inserted into the third recess 433, and a fourth recess 434 which is recessed from the second periphery 442 and into which the third protrusion 423 is inserted when the housing 110 is unfolded.

However, the number of protrusions 420 and recesses 430, formed on the metal plate 410, is not limited thereto. For example, the first metal plate 411 may further include a fifth protrusion (not shown), and the second metal plate 412 may further include a sixth protrusion (not shown).

According to an embodiment, the multiple protrusions and the multiple recesses may be formed in at least one of the first multiple areas 1500 in FIG. 15. For example, the first protrusion 421, the second recess 432, the fourth protrusion 424, and the third recess 433 may be formed in the first area 1501, and the third protrusion 423, the fourth recess 434, the first recess 431, and the second protrusion 422 may be formed in the seventh area 1507.

According to an embodiment, areas in which multiple protrusions and multiple recesses are formed have been described as being the first area 1501 and the seventh area 1507, but the disclosure is not limited thereto. For example, the protrusion 420 and the recess 430 may be further formed in the second area 1502.

According to an embodiment, the multiple protrusions 420 and the multiple recesses 430 are formed, and thus a shear motion or torsion of the metal plate 410 in a first axis direction due to external impact may be reduced compared with the case in which a single protrusion 420 and a single recess 430 are formed.

According to an embodiment, the shear motion or torsion of the metal plate 410 is reduced, and thus a shear motion or torsion of the main display 200, disposed on the metal plate 410, in the first axis direction may be reduced.

Figure 17:
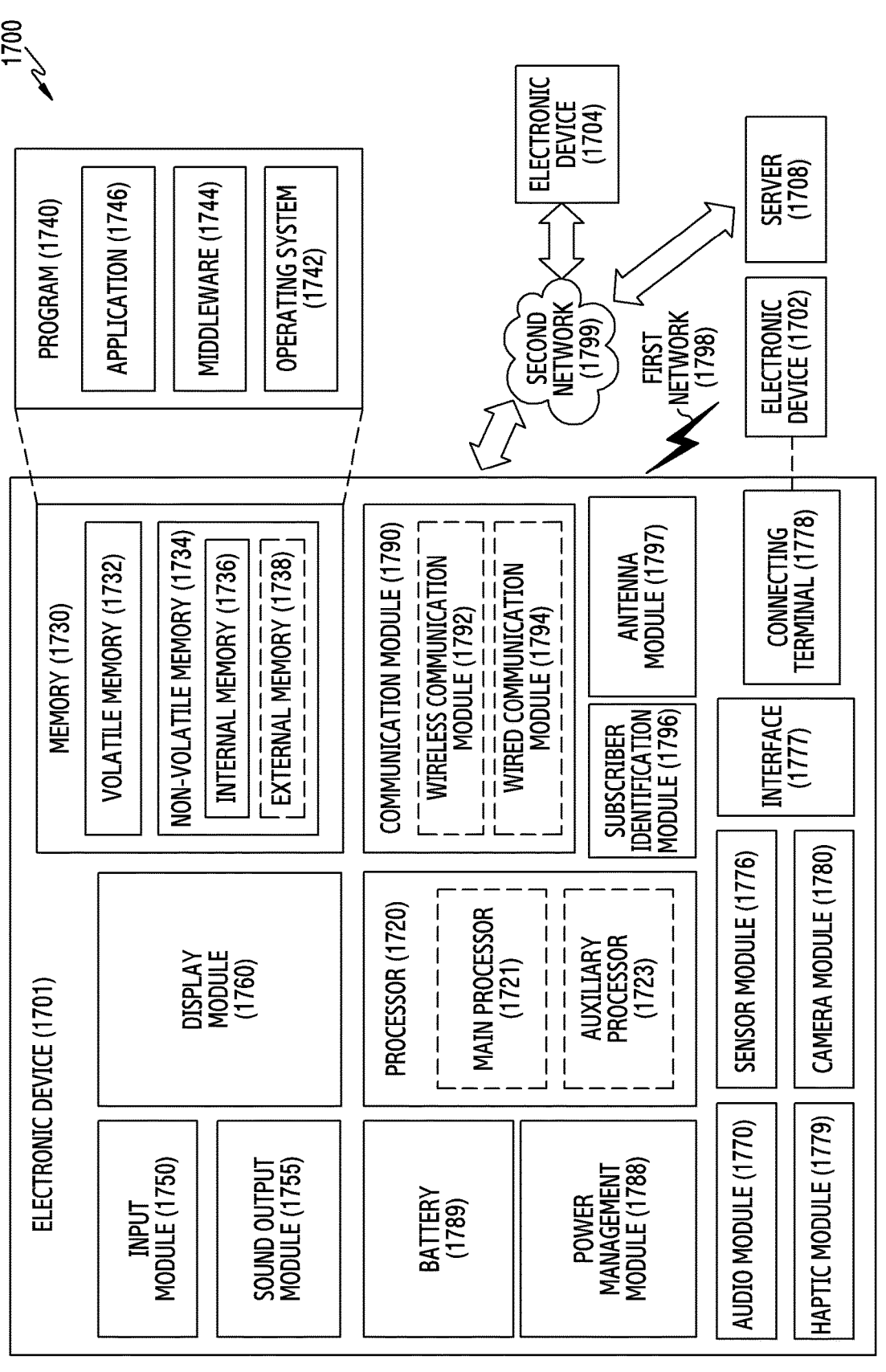
FIG. 17 illustrates an electronic device in a network environment according to an embodiment of the disclosure.

FIG. 17 illustrates an electronic device in a network environment according to an embodiment of the disclosure.

FIG. 17 is a block diagram illustrating an electronic device 1701 in a network environment 1700 according to an embodiment of the disclosure. Referring to FIG. 17, the electronic device 1701 in the network environment 1700 may communicate with an electronic device 1702 via a first network 1798 (e.g., a short-range wireless communication network), or at least one of an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, memory 1730, an input module 1750, a sound output module 1755, a display module 1760, an audio module 1770, a sensor module 1776, an interface 1777, a connecting terminal 1778, a haptic module 1779, a camera module 1780, a power management module 1788, a battery 1789, a communication module 1790, a subscriber identification module (SIM) 1796, or an antenna module 1797. In some embodiments, at least one of the components (e.g., the connecting terminal 1778) may be omitted from the electronic device 1701, or one or more other components may be added in the electronic device 1701. In some embodiments, some of the components (e.g., the sensor module 1776, the camera module 1780, or the antenna module 1797) may be implemented as a single component (e.g., the display module 1760).

The processor 1720 may execute, for example, software (e.g., a program 1740) to control at least one other component (e.g., a hardware or software component) of the electronic device 1701 coupled with the processor 1720, and may perform various data processing or computation. According to one embodiment, as at least part of the data processing or computation, the processor 1720 may store a command or data received from another component (e.g., the sensor module 1776 or the communication module 1790) in volatile memory 1732, process the command or the data stored in the volatile memory 1732, and store resulting data in non-volatile memory 1734. According to an embodiment, the processor 1720 may include a main processor 1721 (e.g., a central processing unit (CPU) or an application processor (AP)), or an auxiliary processor 1723 (e.g., a graphics processing unit (GPU), a neural processing unit (NPU), an image signal processor (ISP), a sensor hub processor, or a communication processor (CP)) that is operable independently from, or in conjunction with, the main processor 1721. For example, when the electronic device 1701 includes the main processor 1721 and the auxiliary processor 1723, the auxiliary processor 1723 may be adapted to consume less power than the main processor 1721, or to be specific to a specified function. The auxiliary processor 1723 may be implemented as separate from, or as part of the main processor 1721.

The auxiliary processor 1723 may control at least some of functions or states related to at least one component (e.g., the display module 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to an embodiment, the auxiliary processor 1723 (e.g., an image signal processor or a communication processor) may be implemented as part of another component (e.g., the camera module 1780 or the communication module 1790) functionally related to the auxiliary processor 1723. According to an embodiment, the auxiliary processor 1723 (e.g., the neural processing unit) may include a hardware structure specified for artificial intelligence model processing. An artificial intelligence model may be generated by machine learning. Such learning may be performed, e.g., by the electronic device 1701 where the artificial intelligence is performed or via a separate server (e.g., the server 1708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input module 1750 may receive a command or data to be used by another component (e.g., the processor 1720) of the electronic device 1701, from the outside (e.g., a user) of the electronic device 1701. The input module 1750 may include, for example, a microphone, a mouse, a keyboard, a key (e.g., a button), or a digital pen (e.g., a stylus pen).

The sound output module 1755 may output sound signals to the outside of the electronic device 1701. The sound output module 1755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1760 may visually provide information to the outside (e.g., a user) of the electronic device 1701. The display module 1760 may include, for example, a display, a hologram device, or a projector and control circuitry to control a corresponding one of the display, hologram device, and projector. According to an embodiment, the display module 1760 may include a touch sensor adapted to detect a touch, or a pressure sensor adapted to measure the intensity of force incurred by the touch.

The audio module 1770 may convert a sound into an electrical signal and vice versa. According to an embodiment, the audio module 1770 may obtain the sound via the input module 1750, or output the sound via the sound output module 1755 or a headphone of an external electronic device (e.g., an electronic device 1702) directly (e.g., wiredly) or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly (e.g., wiredly) or wirelessly. According to an embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment, the connecting terminal 1778 may include, for example, an HDMI connector, a USB connector, an SD card connector, or an audio connector (e.g., a headphone connector).

The haptic module 1779 may convert an electrical signal into a mechanical stimulus (e.g., a vibration or a movement) or electrical stimulus which may be recognized by a user via his tactile sensation or kinesthetic sensation. According to an embodiment, the haptic module 1779 may include, for example, a motor, a piezoelectric element, or an electric stimulator.

The camera module 1780 may capture a still image or moving images. According to an embodiment, the camera module 1780 may include one or more lenses, image sensors, image signal processors, or flashes.

The power management module 1788 may manage power supplied to the electronic device 1701. According to one embodiment, the power management module 1788 may be implemented as at least part of, for example, a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the application processor (AP)) and supports a direct (e.g., wired) communication or a wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™, Wi-Fi direct, or infrared data association (IrDA)) or the second network 1799 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1792 may identify and authenticate the electronic device 1701 in a communication network, such as the first network 1798 or the second network 1799, using subscriber information (e.g., international mobile subscriber identity (IMSI)) stored in the subscriber identification module 1796.

The wireless communication module 1792 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1792 may support a high-frequency band (e.g., the millimeter wave (mmWave) band) to achieve, e.g., a high data transmission rate. The wireless communication module 1792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1792 may support various requirements specified in the electronic device 1701, an external electronic device (e.g., the electronic device 1704), or a network system (e.g., the second network 1799). According to an embodiment, the wireless communication module 1792 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1797 may transmit or receive a signal or power to or from the outside (e.g., the external electronic device) of the electronic device 1701. According to an embodiment, the antenna module 1797 may include an antenna including a radiating element composed of a conductive material or a conductive pattern formed in or on a substrate (e.g., a printed circuit board (PCB)). According to an embodiment, the antenna module 1797 may include a plurality of antennas (e.g., array antennas). In such a case, at least one antenna appropriate for a communication scheme used in the communication network, such as the first network 1798 or the second network 1799, may be selected, for example, by the communication module 1790 (e.g., the wireless communication module 1792) from the plurality of antennas. The signal or the power may then be transmitted or received between the communication module 1790 and the external electronic device via the selected at least one antenna. According to an embodiment, another component (e.g., a radio frequency integrated circuit (RFIC)) other than the radiating element may be additionally formed as part of the antenna module 1797.

According to various embodiments, the antenna module 1797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the electronic devices 1702 or 1704 may be a device of a same type as, or a different type, from the electronic device 1701. According to an embodiment, all or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, mobile edge computing (MEC), or client-server computing technology may be used, for example. The electronic device 1701 may provide ultra low-latency services using, e.g., distributed computing or mobile edge computing. In another embodiment, the external electronic device 1704 may include an internet-of-things (IoT) device. The server 1708 may be an intelligent server using machine learning and/or a neural network. According to an embodiment, the external electronic device 1704 or the server 1708 may be included in the second network 1799. The electronic device 1701 may be applied to intelligent services (e.g., smart home, smart city, smart car, or healthcare) based on 5G communication technology or IoT-related technology.

According to various embodiments an electronic device may include a housing including a first housing and a second housing, a foldable display including a first area disposed on the front surface of the first housing and a second area disposed on the front surface of the second housing, a hinge structure connecting the first housing to the second housing such that the second housing is rotatable about a first axis with respect to the first housing, and a metal plate disposed on the rear surface of the foldable display, wherein the metal plate includes a first metal plate disposed on the rear surface of the first area and covering at least a part of the first housing and a part of the hinge structure, and a second metal plate disposed on the rear surface of the second area and covering at least a part of the second housing and a part of the hinge structure, the first metal plate includes a first recess recessed from a first periphery of the first metal plate adjacent to the first axis, and a first protrusion spaced apart from the first recess and extending from the first periphery, and the second metal plate includes a second recess recessed from a second periphery of the second metal plate adjacent to the first axis and receiving the first protrusion when the housing is unfolded, and a second protrusion extending from the second periphery and inserted into the first recess when the housing is unfolded.

According to an embodiment, the first protrusion may have a first height extending in a direction of the first axis and a first width extending in a direction of a second axis perpendicular to the first axis, and the first height may be longer than the first width.

According to an embodiment, the first metal plate may further include a third recess adjacent to the first protrusion of the first metal plate and recessed from the first periphery of the first metal plate, and a third protrusion adjacent to the first recess of the first metal plate and extending from the first periphery.

According to an embodiment, the second metal plate may further include a fourth protrusion extending from the second periphery of the second metal plate and inserted into the third recess of the first metal plate when the housing is unfolded, and a fourth recess is recessed from the second periphery and receiving the third protrusion of the first metal plate when the housing is unfolded.

According to an embodiment, the hinge structure may further include a hinge bracket disposed on the rear surface of a hinge module of the hinge structure when the housing is unfolded, wherein the hinge bracket forms a guide hole into which the first protrusion of the first metal plate and the second protrusion of the second metal plate are inserted when the housing is folded.

According to an embodiment, the electronic device may further include a flexible printed circuit board (FPCB) electrically connecting a first electronic component disposed in the first housing to a second electronic component disposed in the second housing, the hinge structure may include a center area through which the FPCB passes, and the first protrusion of the first metal plate and the second recess of the second metal plate may be disposed to be spaced apart from each other in the center area.

According to an embodiment, the first protrusion of the first metal plate may be formed in a first area adjacent to a first end of the first periphery, and the first recess of the first metal plate may be formed in a second area adjacent to a second end of the first periphery opposite to the first end.

According to an embodiment, the hinge structure may include a hinge gear allowing the second housing to rotate about the first axis, the first metal plate may further include a third protrusion distinct from the first protrusion and extending from the first periphery and a third recess distinct from the first recess and recessed from the first periphery, the second metal plate may further include a fourth protrusion received in the third recess and a fourth recess distinct from the second recess and receiving the third protrusion, and the third protrusion and the fourth recess may be formed in a third area spaced apart from the hinge gear and the first area.

According to an embodiment, the hinge gear may be disposed between the first area and the third area.

According to an embodiment, the first protrusion may include a first edge extending from one point of the first periphery of the first metal plate toward a second axis perpendicular to the first axis, a second edge symmetric to the first edge with reference to the second axis, and a third edge connecting one end of the first edge to one end of the second edge, wherein the first edge and the second edge forms a predetermined angle with reference to the first axis and extends toward the second axis.

According to an embodiment, the first protrusion may be formed in a rectangular shape.

According to an embodiment, the first protrusion of the first metal plate may be perpendicular to a first direction facing the first axis and may extend in a second direction in which the second metal plate is positioned when the housing is unfolded.

According to an embodiment, the electronic device may further include a waterproof member disposed between the hinge structure and the metal plate.

According to an embodiment, the foldable display may further include a cover panel.

According to an embodiment, the electronic device may further include a digitizer disposed between the foldable display and the metal plate.

According to various embodiments, an electronic device may include a housing including a first housing and a second housing, a foldable display including a first area disposed on the front surface of the first housing and a second area disposed on the front surface of the second housing, a hinge structure connecting the first housing to the second housing such that the second housing is rotatable about a first axis with respect to the first housing, the hinge structure including a hinge gear allowing the second housing to rotate about the first axis and a hinge module connected to the hinge gear, and a metal plate disposed on the rear surface of the foldable display, wherein the metal plate includes a first metal plate disposed on the rear surface of the first area and covering at least a part of the first housing and a part of the hinge structure, and a second metal plate disposed on the rear surface of the second area and covering at least a part of the second housing and a part of the hinge structure, the first metal plate includes a first recess recessed from a first periphery of the first metal plate adjacent to the first axis, and a first protrusion spaced apart from the first recess and extending from the first periphery, the second metal plate includes a second recess recessed from a second periphery of the second metal plate adjacent to the first axis and receiving the first protrusion when the housing is unfolded, and a second protrusion extending from the second periphery and inserted into the first recess when the housing is unfolded, and the hinge module includes a first hinge module, which is disposed on the rear surface of the first metal plate and includes a first hinge module protrusion overlapping the first protrusion and a second hinge module recess overlapping the first recess when viewed from the front surface of the electronic device, and a second hinge module, which is disposed on the rear surface of the second metal plate and includes a first hinge module protrusion overlapping the second protrusion and a second hinge module recess overlapping the second recess when viewed from the front surface of the electronic device.

According to an embodiment, the first protrusion may have a first height extending in a direction of the first axis and a first width extending in a direction of a second axis perpendicular to the first axis, and the first height may be longer than the first width.

According to an embodiment, the first metal plate may further include a third recess adjacent to the first protrusion of the first metal plate and recessed from the first periphery of the first metal plate, and a third protrusion adjacent to the first recess of the first metal plate and extending from the first periphery.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1740) including one or more instructions that are stored in a storage medium (e.g., internal memory 1736 or external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the first protrusion of the first metal plate may be formed in a first area adjacent to a first end of the first periphery, and the first recess of the first metal plate may be formed in a second area adjacent to a second end of the first periphery opposite to the first end.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1740) including one or more instructions that are stored in a storage medium (e.g., internal memory 1736 or external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a first housing and a second housing;
a foldable display including a first area disposed on a front surface of the first housing and a second area disposed on a front surface of the second housing;
a hinge structure including a hinge bracket and a hinge assembly for connecting the first housing to the second housing such that the second housing is rotatable about a first axis with respect to the first housing; and
a metal plate disposed on a rear surface of the foldable display,
wherein the metal plate comprises:
a first metal plate disposed on a rear surface of the first area and covering at least part of the first housing and a first part of the hinge structure, and
a second metal plate disposed on a rear surface of the second area and covering at least part of the second housing and a second part of the hinge structure,
wherein the first metal plate comprises:
a first recess recessed from a first periphery of the first metal plate adjacent to the first axis, and
a first protrusion spaced apart from the first recess and extending from the first periphery,
wherein the second metal plate comprises:
a second recess recessed from a second periphery of the second metal plate adjacent to the first axis and receiving the first protrusion in response to the housing being unfolded, and
a second protrusion extending from the second periphery and inserted into the first recess in response to the housing being unfolded,
wherein the hinge bracket forms a guide comprising a guide hole guiding a hinge assembly protrusion of the hinge assembly, and
wherein the guide hole guides the first protrusion of the first metal plate to be inserted into the guide hole in response to the housing being folded.

2. The electronic device of claim 1,
wherein the first protrusion has a first height extending in a direction of the first axis and a first width extending in a direction of a second axis perpendicular to the first axis, and
wherein the first height is longer than the first width.

3. The electronic device of claim 1, wherein the first metal plate further comprises:
a third recess adjacent to the first protrusion of the first metal plate and recessed from the first periphery of the first metal plate; and a third protrusion adjacent to the first recess of the first metal plate and extending from the first periphery.

4. The electronic device of claim 3, the second metal plate further comprises:
a fourth protrusion extending from the second periphery of the second metal plate and inserted into the third recess of the first metal plate in response to the housing being unfolded; and
a fourth recess recessed at the second periphery and receiving the third protrusion of the first metal plate in response to the housing being unfolded.

5. The electronic device of claim 1,
wherein the hinge bracket is disposed on a rear surface of the hinge assembly in response to the housing being unfolded, and
wherein the guide includes another guide hole into which the second protrusion of the second metal plate is inserted in response to the housing being folded.

6. The electronic device of claim 1, further comprising:
a flexible printed circuit board (FPCB) electrically connecting a first electronic component disposed in the first housing to a second electronic component disposed in the second housing,
wherein the hinge structure further includes a center area through which the FPCB passes, and
wherein the first protrusion of the first metal plate and the second recess of the second metal plate are disposed to be spaced apart from each other in the center area.

7. The electronic device of claim 1,
wherein the first protrusion of the first metal plate is formed in a first area adjacent to a first end of the first periphery, and
wherein the first recess of the first metal plate is formed in a second area adjacent to a second end of the first periphery opposite to the first end.

8. The electronic device of claim 7,
wherein the hinge structure further includes a hinge gear allowing the second housing to rotate about the first axis,
wherein the first metal plate further comprises:
a third protrusion distinct from the first protrusion and extending from the first periphery, and
a third recess distinct from the first recess and recessed at the first periphery,
wherein the second metal plate further comprises:
a fourth protrusion received in the third recess, and
a fourth recess distinct from the second recess and receiving the third protrusion, and
wherein the third protrusion and the fourth recess are formed in a third area spaced apart from the hinge gear and the first area.

9. The electronic device of claim 8, wherein the hinge gear is disposed between the first area and the third area.

10. The electronic device of claim 1,
wherein the first protrusion comprises:
a first edge extending from one point of the first periphery of the first metal plate toward a second axis perpendicular to the first axis;
a second edge symmetric to the first edge with reference to the second axis; and
a third edge connecting one end of the first edge to one end of the second edge,
wherein the first edge and the second edge form a predetermined angle with reference to the first axis, and
wherein the first edge and the second edge extend toward the second axis.

11. The electronic device of claim 1, wherein the first protrusion is formed in a rectangular shape.

12. The electronic device of claim 1, wherein the first protrusion of the first metal plate is perpendicular to a first direction facing the first axis and extends in a second direction in which the second metal plate is positioned in response to the housing being unfolded.

13. The electronic device of claim 1, further comprising:
a waterproof member disposed between the hinge structure and the metal plate.

14. The electronic device of claim 1, wherein the foldable display further includes a cover panel.

15. The electronic device of claim 1, further comprising:
a digitizer disposed between the foldable display and the metal plate.

16. An electronic device comprising:
a housing comprising a first housing and a second housing;
a foldable display comprising a first area disposed on a front surface of the first housing and a second area disposed on a front surface of the second housing;
a hinge structure including a hinge bracket and a hinge assembly for connecting the first housing to the second housing such that the second housing is rotatable about a first axis with respect to the first housing, the hinge structure further including a hinge gear connected to the hinge assembly, the hinge gear allowing the second housing to rotate about the first axis; and
a metal plate disposed on a rear surface of the foldable display,
wherein the metal plate comprises:
a first metal plate disposed on a rear surface of the first area and covering at least part of the first housing and a first part of the hinge structure, and
a second metal plate disposed on a rear surface of the second area and covering at least part of the second housing and a second part of the hinge structure,
wherein the first metal plate comprises:
a first recess recessed from a first periphery of the first metal plate adjacent to the first axis, and
a first protrusion spaced apart from the first recess and extending from the first periphery,
wherein the second metal plate comprises:
a second recess recessed from a second periphery of the second metal plate adjacent to the first axis and receiving the first protrusion in response to the housing being unfolded, and
a second protrusion extending from the second periphery and inserted into the first recess in response to the housing being unfolded,
wherein the hinge assembly comprises:
a first hinge assembly disposed on a rear surface of the first metal plate and including a first hinge assembly protrusion and a first hinge assembly recess, the first hinge assembly protrusion overlapping the first protrusion and the first hinge assembly recess overlapping the first recess when viewed from a front surface of the electronic device, and
a second hinge assembly disposed on a rear surface of the second metal plate and including a second hinge assembly protrusion and a second hinge assembly recess, the second hinge assembly protrusion overlapping the second protrusion and the second hinge assembly recess overlapping the second recess when viewed from the front surface of the electronic device, and
wherein the hinge bracket forms a guide comprising a guide hole guiding the first protrusion of the first metal plate to be inserted in response to the housing being folded.

17. The electronic device of claim 16,
wherein the first protrusion has a first height extending in a direction of the first axis and a first width extending in a direction of a second axis perpendicular to the first axis, and
wherein the first height is longer than the first width.

18. The electronic device of claim 16, wherein the first metal plate further comprises:
a third recess adjacent to the first protrusion of the first metal plate and recessed from the first periphery of the first metal plate; and
a third protrusion adjacent to the first recess of the first metal plate and extending from the first periphery.

19. The electronic device of claim 16,
wherein the hinge bracket is disposed on a rear surface of the hinge assembly of the hinge structure when the housing is unfolded, and
wherein the guide includes another guide hole into which and the second protrusion of the second metal plate is inserted when the housing is folded.

20. The electronic device of claim 16,
wherein the first protrusion of the first metal plate is formed in a first area adjacent to a first end of the first periphery, and
wherein the first recess of the first metal plate is formed in a second area adjacent to a second end of the first periphery opposite to the first end.

21. The electronic device of claim 16, wherein the metal plate disposed on a rear surface of the foldable display is secured to a bracket disposed the rear surface of the foldable display.

22. The electronic device of claim 21, wherein the metal plate is secured to the bracket via a waterproof tape.

* * * * *